US009580137B2

(12) United States Patent
Felker

(10) Patent No.: US 9,580,137 B2
(45) Date of Patent: Feb. 28, 2017

(54) DUAL POWERED PROPULSION SYSTEM

(71) Applicant: Thomas S. Felker, Paradise Valley, AZ (US)

(72) Inventor: Thomas S. Felker, Paradise Valley, AZ (US)

(\*) Notice: Subject to any disclaimer, the term of this patent is extended or adjusted under 35 U.S.C. 154(b) by 0 days.

(21) Appl. No.: 14/255,790

(22) Filed: Apr. 17, 2014

(65) Prior Publication Data

US 2015/0298761 A1   Oct. 22, 2015

(51) Int. Cl.
*B62M 1/12* (2006.01)
*B62M 9/00* (2006.01)

(52) U.S. Cl.
CPC ......... *B62M 1/12* (2013.01); *B62M 2009/005* (2013.01)

(58) Field of Classification Search
CPC ........... B62M 1/12; B62K 23/06; B62K 23/08
USPC ....................................................... 280/234
See application file for complete search history.

(56) References Cited

U.S. PATENT DOCUMENTS

| | | |
|---|---|---|
| 619,637 A | 2/1899 | Tucker |
| 690,180 A | 12/1901 | Pierson |
| 2,232,120 A * | 2/1941 | Letsch ..................... B62M 1/12 280/234 |
| 2,416,092 A * | 2/1947 | Genin ...................... B62M 1/12 280/234 |
| 2,510,013 A | 5/1950 | Edgar |
| 3,800,866 A | 4/1974 | Ireland et al. |
| 3,913,945 A | 10/1975 | Clark |
| 3,921,464 A | 11/1975 | Greseth |
| 3,978,919 A | 9/1976 | Fachbach et al. |
| 4,062,401 A | 12/1977 | Rudny et al. |
| 4,136,735 A | 1/1979 | Beck et al. |

(Continued)

FOREIGN PATENT DOCUMENTS

| | | |
|---|---|---|
| DE | 102010034035 | 2/2012 |
| EP | 91107605.7 | 11/1991 |
| FR | 2686305 | 7/1993 |

OTHER PUBLICATIONS

Felker, Thomas S., Dual Powered Propulsion System, Patent Cooperation Treaty Application Serial No. PCT/US15/26137, filed Apr. 16, 2015, International Search Report and Written Opinion dated Jul. 10, 2015.

*Primary Examiner* — Joseph Rocca
*Assistant Examiner* — Michael Stabley
(74) *Attorney, Agent, or Firm* — Schmeiser, Olsen & Watts LLP

(57) ABSTRACT

The present invention relates to a rider's simultaneous use of his forearms/hands and legs to provide dual power into a propulsion system for riding a cycle vehicle, including a bicycle and a tricycle, or other vehicles. The invention permits the rider to have complete control turning the cycle vehicle, at will, right or left, while at the same time pumping a set of forearm/hand bars in an up power stroke and a down power stroke. In addition, even though the pumping action is lineally moving a telescoping rod and a push/pull cable back and forth, it is also simultaneously rotating a flywheel, upper and lower sprockets, and the crank axle to drive the bicycle wheel forward over the riding surface. Thus, the rider can provide maximum power into rotating the rear tire by simultaneously using both his arms and legs, while contemporaneously controlling his direction of travel.

32 Claims, 20 Drawing Sheets

(56) References Cited

U.S. PATENT DOCUMENTS

| | | |
|---|---|---|
| 4,180,130 A | 12/1979 | Beck et al. |
| 4,181,172 A | 1/1980 | Longhouse |
| 4,184,541 A | 1/1980 | Beck et al. |
| 4,329,946 A | 5/1982 | Longhouse |
| 4,524,987 A | 6/1985 | Kim |
| 4,541,647 A | 9/1985 | Braun |
| 4,602,781 A | 7/1986 | La Marsh et al. |
| 4,685,692 A | 8/1987 | Fullilove et al. |
| 4,726,600 A | 2/1988 | Wu |
| 4,861,055 A | 8/1989 | Jones |
| 5,184,838 A | 2/1993 | Becoat |
| 5,246,343 A | 9/1993 | Windsor et al. |
| 5,253,889 A | 10/1993 | Kaminski |
| 5,272,928 A | 12/1993 | Young |
| 5,324,057 A | 6/1994 | Chartrand |
| 5,328,195 A | 7/1994 | Sommer et al. |
| 5,330,218 A | 7/1994 | Escudero |
| 5,332,244 A | 7/1994 | Turner et al. |
| 5,372,374 A | 12/1994 | Hudson |
| 5,390,946 A | 2/1995 | Spicer |
| 5,429,379 A | 7/1995 | Grigoriev |
| 5,501,648 A | 3/1996 | Grigoriev |
| 5,829,772 A | 11/1998 | Jones |
| 5,881,685 A | 3/1999 | Foss et al. |
| 5,943,986 A | 8/1999 | Kern et al. |
| 6,032,970 A | 3/2000 | Porter |
| 6,068,279 A | 5/2000 | Dion |
| 6,105,985 A * | 8/2000 | Cosgrave ............ B62M 1/12 280/234 |
| 6,161,854 A | 12/2000 | Christini et al. |
| 6,161,855 A | 12/2000 | Christini et al. |
| 6,182,991 B1 | 2/2001 | Christini et al. |
| 6,193,253 B1 | 2/2001 | Barnett |
| 6,386,839 B1 | 5/2002 | Chuang |
| 6,406,047 B1 | 6/2002 | Sawyer, Jr. |
| 6,439,592 B1 | 8/2002 | Christini et al. |
| 6,659,724 B2 | 12/2003 | Takeuchi et al. |
| 6,676,371 B1 | 1/2004 | Brown |
| 6,688,623 B1 | 2/2004 | Yunaska |
| 6,827,362 B2 | 12/2004 | Smith et al. |
| 6,986,520 B2 | 1/2006 | Smith et al. |
| 7,021,639 B2 | 4/2006 | Park |
| 7,040,260 B2 | 5/2006 | Yoshimatsu et al. |
| 7,201,389 B2 | 4/2007 | Smith et al. |
| 7,413,206 B2 | 8/2008 | Pena et al. |
| 7,497,806 B2 | 3/2009 | Duncan et al. |
| 7,682,286 B2 | 3/2010 | Badarneh et al. |
| 7,698,967 B2 * | 4/2010 | Ording ............ B62K 21/12 74/551.1 |
| 7,752,767 B2 | 7/2010 | Mandaric |
| 7,833,129 B2 | 11/2010 | Badarneh et al. |
| 7,870,809 B2 | 1/2011 | Rice |
| 7,891,686 B1 | 2/2011 | Crawford |
| 7,896,375 B2 | 3/2011 | Cynn |
| 7,963,889 B2 | 6/2011 | Badarneh et al. |
| 7,967,314 B1 | 6/2011 | Mirabile |
| 8,056,916 B2 | 11/2011 | Hudgin |
| 8,157,280 B2 | 4/2012 | Drymalski |
| 8,172,247 B2 * | 5/2012 | Weber ............ B62K 21/125 280/278 |
| 8,181,977 B1 | 5/2012 | Bartlett |
| 8,186,699 B2 | 5/2012 | Green |
| 8,220,578 B2 | 7/2012 | Kerschgens Long |
| 2004/0113384 A1 | 6/2004 | Park |
| 2005/0044981 A1* | 3/2005 | Huang ............ B62K 21/125 74/551.8 |
| 2007/0114086 A1 | 5/2007 | Glessner |
| 2008/0193286 A1 | 8/2008 | Kakishita et al. |
| 2008/0210409 A1 | 9/2008 | Saksager |
| 2011/0148068 A1 | 6/2011 | Hunt |
| 2012/0272777 A1* | 11/2012 | Tolhurst ............ B62K 21/125 74/491 |
| 2012/0295770 A1 | 11/2012 | Lo |
| 2012/0299267 A1 | 11/2012 | Zacchi |

* cited by examiner

DUAL POWERED PROPULSION SYSTEM

BACKGROUND

1. Technical Fields

This invention relates generally to a dual powered bicycle and more particularly to a device for using the rider's arms to supplement power provided by his natural or prosthetic legs pedaling a bicycle to propel the rear wheel as it travels over the ground.

2. Discussion of Related Art

Human powered vehicles employing many different designs for providing human energy to cause movement of the rider's vehicle have been developed and used throughout the ages. These types of vehicles have been used in many activities, including but not limited to sports, riding to work or store, movement of goods and passengers in commerce, physical exercise or other task. The types of vehicles that can utilize the benefits of a combined arm and leg powered crank axle include, but are not limited to, bicycles, tandem bicycles, tricycles, human powered airplanes, human powered helicopters, and water craft.

Current and past variations of combined arm and leg powered vehicles have embraced rotating hand cranks, pumping handle bars "up and down" or "back and forth" over the stem of the bicycle, moving one arm in one direction and the other arm in the opposite direction simultaneously, connection of the moving handle bars directly to rotating pedals or cranks, and the use of systems containing rods, gears, and racks connecting the moving handle bars to the crank axle. An example of this is U.S. Pat. No. 7,413,206.

Other variants from the present invention have provided the ability to obtain only 50% of the available arm power being transferred into rotating crank axle, versus the 100% of arm power which can be obtained by use of this invention, as described herein. An example of this prior art is U.S. Pat. No. 5,328,195, in which a cable is attached to a moveable handle bar that moves "up and down" in unison with a curling action of the rider's arms and hands. Because U.S. Pat. No. 5,328,195 uses only a flexible cable by itself to transfer power from the pumping arm bars to the crank axle, arm power is delivered to the crank axle only during the single condition in which the rider is "pulling-up" on the rotating handle bars and thus pulling-up on the cable. U.S. Pat. No. 5,328,195 does not provide for any power from the rider being delivered to the crank axle when the forearms and hands of the rider are "pushing down" on the movable forearm/hand bars during his "up and down" cycle. This is because standard cables, which are not sliding inside a stationary cable sheath, only provide significant power in the "Pull" mode, and not in the "Compression" mode. With this cable geometry of the cable moving by itself, and not sliding within a stationary sheath, the rider's downward stroke on the forearm bars during this "compression" mode is like pushing on a string, and hence no power can be delivered to the forward rotation of the crank axle during the "down" stroke of the "up and down" cycle. In fact, U.S. Pat. No. 5,328,195 describes an automatic rewind mechanism for the cable during the down stroke thus ensuring that no human power is generated to propel the bicycle forward during the "down" stroke cable movement in the "up and down" cycle of the bicycle's pumping arm/hand bars.

While some of these various types of Dual Powered vehicles have had modest acceptance in the marketplace, they have been deficient because they cause excess resistance and friction-loss in transmitting energy from the moving handle bars to the crank axle, they are clumsy to operate, they only provide energy into the crank axle during the pulling or upward movement of the handle bars, and at high speeds some of the designs can cause the rider's control of the bicycle to be unstable.

The purpose of this invention is to remedy all of the afore-described deficiencies in the prior art.

SUMMARY OF THE INVENTION

It is important to recognize that use of a Sliding Flexible Cable inside a Stationary But Flexible Sheath, as described in this invention, requires that the Stationary Sheath be affixed directly or indirectly to the front forks or frame of the bicycle, and that the cable sliding inside of the Stationary Sheath does not burst the sidewalls of the Stationary Sheath during the "compression" stroke. In addition, the Sliding Flexible Cable must be located inside its Stationary But Flexible Sheath, Hub, Support Tube, or any other device that will contain the Sliding Cable during the "compression" stroke. When used within these design parameters, the Sliding Flexible Cable will not move laterally inside the Sheath to the degree that it balls-up like a bird's nest, nor will it burst out of the Sheath. This is important because no power can be transferred through the Sliding Flexible Cable into the Crank Axle during the "compression" mode, if this Sliding cannot slide smoothly within its Sheath.

This invention provides the ability of the rider to contemporaneously input 100% of his power from a) the "up and down" curling motion of his arms pumping the forearm/hand bars, combined with b) rotational movement of his legs and feet on the Pedals into forward locomotion of the Crank Axle and Rear Wheel of the Bicycle or other vehicle containing this invention. During both the "pull" and "push", or "up" and "down" movement of the Forearm/hand Bars, 100% of his arm power is inputted into the forward rotation of both the Crank Axle and vehicle's driving wheel. Simultaneously, full control for steering the bicycle is provided by virtue of the arm power being delivered only through a vertical and rotating movement of his arms and Forearm/hand Bars, which are connected directly to the Stem, Turning Rod and pivot Fulcrum. Through use only of the rotating "up and down" movement of the Forearm/hand Bars to provide power by the rider, there is no unintended lateral movement of the rider's arms during the power strokes of his Forearm/hand Bars, and hence the rider has complete control and stability of his or her Bicycle. At the same time as the rider can turn the Bicycle toward his left or right direction, he can simultaneously provide Dual Power into the Crank Axle from pedaling his legs.

The current invention relates to a human powered mode of transportation such as a bicycle, tricycle, airplane, helicopter, or boat that is designed and built to incorporate this Dual Power propulsion system in which a rider can simultaneously use both his arms and legs as a means of propulsion, or alternatively using just the arms or legs separately to propel the bicycle.

The Dual Powered Bicycle described herein is designed to improve many facets involved in the riding of a combined arms and legs powered bicycle design, as compared to a bicycle in which the rider uses only power from his legs, to rotate the Crank Axle. Some of these improved facets include, but are not limited to: a) improving the efficiency of the body's lactate uptake by spreading-out over more muscle groups of the body the energy utilized in the locomotion of the vehicle, b) providing a more complete exercise program for the rider by utilizing more muscle groups of the body, c)

permitting the rider to ride the bicycle faster through the implementation of additional muscle groups to provide more energy into the Crank Axle and driving wheel, d) permitting the rider to carry heavier loads by utilizing more muscle groups to power the driving wheel of the bicycle, and e) permitting the rider to have a more efficient usage of the available oxygen in his body by spreading it out over more active muscle groups during a given period of riding time than when the rider is using just his legs. These benefits are a result of the application of the following new Dual Power concepts from this invention: a) using up to 100% of the amount of energy being exerted into the arc shaped "downstroke" of the pumping "Forearm/hand Bars," b) affixing in place the rider's forearms and elbows onto the top of the upper surface of the Forearm Platforms to increase the amount of arm power being delivered into the Crank Axle as a result of the rider's forearms and elbows being held firmly affixed to the upper surface of the Forearm Platforms during the "down" stroke of the arc shaped "up and down" pumping cycles, c) the transfer of power from arc shaped "up and down" cycling of the Forearm/hand Bars into a Push/Pull Flexible Cable System consisting on each end of it a lineally moving Telescoping Rod located inside its respective Support Tube, with the internal ends of each Telescoping Rod attached to the opposite end of the Flexible Sliding Cable, d) a Flexible Cable System located between the two Support Tubes and consisting of a Stationary but Flexible Cable Sheath and Flexible Cable sliding "back and forth" inside the Cable Sheath in unison with the "up and down" pumping Forearm/hand Bars, e) lineally moving an oscillating Connecting Bridge Rod that connects the Lower Rear Telescoping Rod with the rear Flywheel, f) use of a One-way Bearing Clutch Flywheel connected to a Rear Upper Axle, and such axle also being attached to an Upper Rear Sprocket, and g) the Upper Rear Sprocket is connected by a Chain to the rotating Crank Axle.

In the application of this invention for a Dual Powered Bicycle, the invention includes a set of on-demand pumping Forearm/hand Bars that are attached together through means of a Yoke, which extends-out in front of the Bicycle's head set. The invention further consists of Forearm Platforms upon which each forearm of the rider is positioned, this Forearm Platform may contain a fastening device, called a Holder, its purpose is to hold the rider's forearm and elbow stationary and attached onto the top side of the Forearm Platform during the arm's arc shaped "down stroke". Other components include a Cable System comprised of Rod End Bearings, a set of Telescoping Rods located inside their respective Support Sleeves, and such Telescoping Rods in turn are fastened at one end to a corresponding single Flexible Sliding Cable end, a Support Sleeve that guides both the Telescoping Rod and Sliding Flexible Cable as they are lineally "pulled" and then "pushed" "in and out" of the Support Sleeve from the rider's rotational pumping "up and down" cycles of his Forearm/hand Bars as shown in FIGS. 2b, 4b and 5a. Also used are an Upper Front Cable Hub, Upper Front Platform, to which the Upper Front Hub is attached, Stationary but Flexible Cable Sheath held in a stationary position relative to the frame and front forks of the bicycle, with such Sheath containing and guiding the Flexible and Sliding Cable inside this Stationary but Flexible Cable Sheath, c) this Stationary and Flexible Cable Sheath is directly or indirectly attached to the Bicycle in order to keep it Stationary, d) a Lower Rear Hub, e) a Rear Support Sleeve to guide its respective Telescoping Rod, f) this sliding and Telescoping Rod is attached from its rear end to a Connecting Bridge Rod, and g) the rear end of the Sliding Connecting Bridge Rod is attached to a rotating One-way Flywheel containing a one way bearing clutch assemble, as illustrated in FIGS. 6 and 7c. This flywheel is affixed to an Upper Rear Axle. An Upper Rear Sprocket is also included, and it is affixed to the same Upper Rear Axle as the Flywheel. This sprocket has teeth positioned on its circumference, along with a Chain placed over such teeth. This Chain turns in a circular motion over the circumference of the simultaneously turning Upper Rear Sprocket. A second Lower Rear Sprocket is attached to the Crank Axle, which is located within the Bottom Bracket and illustrated in FIG. 7a. In order to effect Dual Power to the Crank Axle, the rider grips the front end handles of the on-demand pumping Forearm/hand Bars with his hands, lays his forearms onto the Forearm Support Platforms, located on top of the rear end of the Forearm/hand Bars, and begins a rotational "up and down" pumping or curling action with his arms while simultaneously steering the Bicycle. Alternatively, he may attach his forearms into attachment mechanisms located on the top side of the pumping Forearm/hand Bar Support Platforms, and then rotate the front of the Forearm/hand Bars in an "up and down" motion through the curling action of his arms. This cyclical angular displacement of the Forearm/hand Bars causes the rear end of the on-demand pumping bars to be rotated upon a Fulcrum, which is located near the rear end of the Forearm/hand Bars; the Yoke of the on-demand Forearm/hand Bars is attached to the most upper front end of the Cable System, which causes the Push/Pull Cable System's telescoping rod to move "in and out" of the Cable System's stationary Upper Front Telescoping Rod Support Sleeve, which then slides its internal Flexible Sliding Cable "back and forth", inside its external Stationary But Flexible Cable Sheath.

An alternative means for connecting the upper front Telescoping Rod to the Yoke and Forearm/hand Bars is through the use of two Racks and one Pinion gear, instead of the use of a single Rod End Bearing. In this alternative design, the vertical Rack is in configuration of an arc, which is defined by the shape of the arc through which the Forearm/hand Bars travel over the Fulcrum during their "up and down" pumping cycle. The teeth on this Vertical Rack, configured in the shape of the arc, are engaged with the rotating but stationary positioned Pinion Gear, causing it to rotate in unison with the arc-shaped Rack that moves lineally "up and down" in accordance with the cycling of the Forearm/hand Bars. The teeth of this same vertically positioned Pinion Gear are also engaged with the teeth of a second Rack, that is straight, and is positioned in front of the Turning Tube, and concurrent with the plane of a line extending forward from the Cable System's Lower Rear Support Tube and Telescoping Rod. This second Rack, that is straight and without any arc, is affixed to the external end of the Upper Front Telescoping Rod as shown in FIG. 4c. Thus, as the Pinion Gear moves "back and forth", in unison with the rotational pumping Forearm/hand Bars, this second Rack moves the Upper Front Telescoping Rod "back and forth". Because this Telescoping Rod is directly attached to the front end of the Sliding Flexible Cable, the oscillating movement and power from this Sliding Cable is transferred into the Connecting Bridge Rod, which ultimately transfers the rider's rotational "up and down" Forearm/hand Bar pumping power into locomotion of the Crank Axle and back driving wheel, as shown in FIGS. 6, 6a, and 1.

The Connecting Bridge Rod then bridges the transfer of power from this "in and out" moving Telescoping Rod into a rotating On-demand Upper Flywheel and Sprocket. One portion of a rotating Chain turns over the circumferentially located teeth on the Upper Rear rotating Sprocket. The opposite end of this Chain then rotates on the circumferentially located teeth of the Lower Crank Sprocket which is attached directly onto the Crank Axle. Utilizing the aforedescribed components, while the rider grasps the front handles of the Forearm/hand Bars, the rider can apply Dual Power into the rotation of the Crank Axle by simply moving, in unison, his arms and hands in an "up and down" curling motion; during this same time, the rider pumps his legs and feet on the pedals to mutually and simultaneously rotate the Crank Axle. Because the Crank Axle is also attached to the Front Sprocket and Chain located on the opposite side of the bike, the rider's Forearm/hand Bar pumping power is transferred into this Front Sprocket and Chain on the right side of the Bike. This chain, generally located on the Bicycle's right side, connects this right Front Sprocket to the rear wheel sprocket or cassette, which turns the Rear Wheel, causing the Rear Wheel and Tire to be rotated over the surface of the ground and propel forward the Bicycle and rider under Dual Power.

As used herein: "up" refers to a general direction away form a ground surface that a cycle vehicle would travel on; "down" refers to a general direction toward a ground surface that a cycle vehicle would travel on; "forward," "forth," or "front" refers to a direction toward a front of a cycle vehicle; "backward," "back," or "rear" refers to a general direction toward a back of a cycle vehicle; "lower" generally refers to a location on a cycle vehicle close to a ground surface that the cycle vehicle would travel on; and "upper" refers to a location on a cycle vehicle that is generally higher than a "lower" location on a cycle vehicle.

Four Basic Systems Comprise the Invention

The operating parts which form this Dual Power invention are divided into four primary systems:

I) Upper Drive System. The parts in this system are numbered in the 100 series, and they include: a) pumping Forearm/hand Bars, b) Forearm/elbow Support Platforms, c) Forearm/elbow Support Holders, d) Forearm Bar Hand Grips, e) Adjustable Hand Grips, f) Stationary Latch to hold in place the Forearm/hand Bars, g) Fulcrum Rod upon which the Forearm/hand Bars rotate, h) Bearings attached to both the Fulcrum Rod and rear of Forearm/hand Bars, i) Upper and Downward Stroke Stoppers, j) Yoke holding together the Forearm/hand Bars, k) Upper Yoke/Telescoping Rod Attachment Bracket, l) Upper Telescoping Rod End Bearing, m) Upper Front Telescoping Rod, n) Upper Front Support Sleeve for Telescoping Rod, o) Horizontal Support Strut, p) Vertical Support Strut, q) and Upper Front Platform to hold stationary the Upper Front Cable System Hub.

II) 100% Power Transfer Cable System Which Allows Bicycle Steering. This Push/Pull Cable System transfers nearly 100% of continuously generated human arm power from the Upper Drive System into the Lower Drive System, while simultaneously permitting the rider to have unfettered turning capability of the Bicycle's Front Wheel during the rider's rotational "up and down" pumping power cycles with his forearms using a curling motion. The parts in this system are numbered in the 200 series, and consist of a) Upper Front Platform to hold stationary, relative to the Bicycle frame and Front Forks, the Upper Front Hub of the Cable System, b) Upper Front Hub, c) Sliding Flexible Cable, d) Stationary but Flexible Cable Sheath through which the internal Flexible Cable slides "back and forth" in unison with the "up and down" pumping action of the Forearm/hand Bars by the rider, and front section of lower Hub.

III) Lower Drive System. The parts in this system convert the Sliding Flexible Cable's lineal power into rotating power and are numbered in the 300 series. They consist of: a) Lower Rear Hub affixed in a stationary position to the Bicycle frame, b) Lower Support Sleeve attached to this Lower Rear Hub, and through which the Sliding Interior Flexible Cable slides "back and forth", c) Telescoping Rod connected on its interior forward end with the rear end of the Flexible Sliding Interior Cable, d) and which Sliding Interior Cable connects and transfers power from the Upper Telescoping Rod to the Lower Telescoping Rod, e) Lower Rear Connecting Bridge Rod attached on its forward end to the external rear end of the Lower Telescoping Rod—this Bridge Rod slides "back and forth" over a stationary Bridge Rod Support Bracket, f) Rod End Bearing connecting the rear oscillating end of the Lower Bridge Connecting Rod to the Flywheel, g) Flywheel, f) One-way Clutch Bearing housed in the Flywheel, g) Upper Rear Axle attached to the Bicycle frame, h) Upper Rear Sprocket located adjacent to the Flywheel and affixed to the Upper Rear Axle along with the Flywheel, i) Lower Sprocket attached to the Crank Axle, and j) Chain attached to the circumferentially located teeth around the Upper Rear Sprocket and the Lower Sprocket attached to the Crank Axle.

IV) Upright Positioned Rider Forearm/Hand Bar System. In riding situations in which the rider is sitting upright in the Saddle while riding the Bicycle, there are two Hinges, with one Hinge located on the rear end of its respective Forearm/hand Bars and also on the left and right sides of the rear ends of the single Fulcrum Bar. These two Hinges connect and hold together the Forearm/hand Bars to the Fulcrum Bar. The Fulcrum Rod is U shaped, and is attached at its center point to the Stem on the top of the Turning Tube, This U shaped Fulcrum Bar acts as a support for both the Forearm/hand Bars and the Fulcrum/hinge. The U shaped Fulcrum Bar may be shaped diagonally to the ground or horizontal to the ground. In the case whereby they are diagonal, the rider will ride with his forearms in a diagonal position to the ground. In the case wherein the U shaped Fulcrum Rod and Forearm/hand Bars are horizontal to the ground, the rider's forearms will be located in a horizontal position to the ground. In both cases, the forearms of the rider will be located behind the Stem and Turning Tube, as shown in FIGS. 9a and 9b.

LIST OF THE INVENTION'S COMPONENT PARTS

1) Bicycle Frame;
2) Top Tube;
3) Down Tube;
4) Seat Tube;
5) Front Forks;
6) Front Wheels/Spokes/Tires;
7) Rear Wheels/Spokes/Tires;
8) Seat;
9) Left Pedal;
10) Left Crank;
11) Right Pedal;
12) Right Crank;

13) Crank Axle connecting the left side pedal crank and left side pedal crank sprocket with the right front chain sprocket attached to this same crank axle;
14) Right Front Sprocket or Derailleur Sprockets and Chain;
15) Right Rear Sprocket, Derailleur Sprocket or Cassette and Chain;
   a) Seat Stay
   b) Chain Stay
16) Head Tube;
   a) Stem
17) Turning Tube
I) Series 100—Upper Drive System
118) Pumping Forearm/Hand Bars;
119) Forearm/Elbow Support Platforms;
120) Forearm and Elbow Support Holders,
   (a) Cloth type (for example Velcro) Attachment Mechanism to Hold in Place the Rider's Elbow and Forearm to the Upper Side of the Forearm Holders;
   (b) Mechanical means for Providing Breakaway Attachment Mechanism to Hold in Place the Rider's Elbow and Forearm to the Upper Side of the Forearm Holders;
121) Forearm Bar Hand Grips attached to front end of forearm/hand pumping bars;
122) Stationary Latch to Hold in Place the Forearm/Hand Bars
   a) Latching bracket affixed to the steering tube;
   b) Latch hook or receiving bracket for the clasp attached to the Downward Stroke Stopper;
   c) Latching clasp that is pulled in or out of the hook by moving the lever attached to the clasp;
   d) Lever attached to both the Latch bracket and the clasp, and rotates forward or backward on its pivot point;
123) Yoke Holding Together the Two Forearm/Hand Bars;
   a) Upper yoke/telescoping Rod Attachment Bracket;
124) Upper Front Telescoping Rod End Bearing Connecting the Upper yoke/telescoping Rod Attachment Bracket to the outer end of this Telescoping Upper Front Rod;
125) Fulcrum Rod over which Pumping Forearm/Hand Bars rotate during their pumping action;
126) Bearings Attached to both the Fulcrum Rod and Rear section of Forearm Bars;
127) Downward Stroke Stopper for Forearm/Hand Bars;
128) Horizontal Support Strut protruding forward to the Upper Front Platform, from the Vertical Support Bracket attached to the Front Fork on one end and the Turning Tube on the top end;
129) Vertical Support Strut positioned from the Steering Tube to the upper Front Fork;
130) Interfacing Bracket between the Turning Tube and the Vertical Support Strut from the Front Fork to this Turning Tube Bracket;
131) Upper Front Rod Support Sleeve in which the Upper Front Telescoping Rod is guided as it moves "up and down" during the rotational pumping action of the Forearm/hand Bars;
132) Upper Front Telescoping Rod that moves "Up and Down" inside its Support Sleeve;
133) Upper Front Platform, attached directly or indirectly to the Front Forks,
   a) Attached to the Upper Front Platform is a hollow threaded Hub, through which the Sliding Flexible Internal Cable travels "back and forth". On each end of the Hub is an opening, and attached to the upper Hub opening is the Upper Front Support Tube; Attached to the bottom opening in the Hub is front end of the Stationary but Flexible Cable Sheath;
   b) On the lower opening of the Upper Front Hub is a nut threaded onto the lower end of this Hub, and which holds in a stationary position the external Flexible Cable Sheath which surrounds and protects the Lineally Sliding Internal and Flexible Cable.
   c) Attached to the upper end of the Upper Front Hub is the lower end of the Upper front Support Tube, through which both the Upper Front Telescoping Rod and upper end of the Internal Flexible Cable slide in unison with the pumping Forearm/hand bars;
   d) Inside the upper opening of this Upper Front Support Sleeve, its respective Telescoping Internal Rod slides back and forth in unison with the rider pumping the Forearm/hand Bars rotationally "up and down";
134) Arc Shaped Rack attached to Forearm Bars and Yoke, and whose teeth are engaged with teeth of the Pinion Gear;
135) Straight Rack attached to the Telescoping Upper Front Rod, and whose teeth are engaged with the teeth of the Pinion Gear;
136) Pinion Gear engaged with both Racks and held stationary relative to both Racks and the Upper Front Support Sleeve and Upper Front Telescoping Rod;
II) Series 200—Power Transfer and Steerable Cable System
234) This is an example of a Stationary but Flexible Cable Sheath containing a Sliding Flexible Cable:
   a) Flexible Sliding Internal Metallic stranded wound wire cable that slides "back and forth" inside its sheath;
   b) Liner between metallic cable and sheath;
   c) Exterior Flexible but Stationary Cable Sheath that does not slide, and covers the Flexible Sliding Internal Cable to keeps it from bursting or balling-up in a bird's nest configuration during the "compression" or "push" stroke of the cable;
   d) Cable system Hub and Hub End Caps, one on each Hub;
   e) Means of connecting the rear Rod Support Sleeve to both the Upper and Lower Hubs;
This Cable System serves at least the following two primary purposes that are integral to this invention: 1) Precludes the Flexible Sliding Internal Cable from coming apart or bursting outside its Sheath while sliding under power in the "down" or "compression" stroke of the Forearm/hand Bars; and 2) Because both the Sliding Internal Cable and the External Stationary Flexible Cable Sheath are flexible, this permits the rider to control the bicycle by turning its Front Wheel to the right or left, while at the same time pumping the Forearm/hand Bars in an arc shape "up and down", thereby providing rotational power to the Crank Axle;
   f) Hub End Cap and Support Tube with two rollers, and one groove cut into the center of each roller, to guide the sliding cable as it slides between the Hub End Cap and the Tube Support;
III) Lower Rear Drive System
335) Lower Rear Telescoping Rod which slides "back and forth" inside its corresponding Lower Rear Support Sleeve, and is connected to the rear end of the linear moving Internal Sliding Cable; this Sliding Cable is connected on its opposite end to the Upper Drive System 100;
   a) Lower Rear Support Sleeve through which moves, in a "back and forth" motion, both the rear end of the Internal Flexible Cable and its attached Lower Rear Telescoping Rod;
   b) Rear Connecting Bridge Rod which is connected at its front end to the rear end of the Lower Rear Telescoping Rod and on its rear end is connected to the Lower Rod End Bearing, which is attached to the rotating Flywheel;
c) Sliding Support Bracket that is attached to the Lower Rear Stationary Connecting Support Bracket, and slides back and forth over it in unison with the "up and down" pumping of the Forearm/hand Bars by the rider;
d) Lower Rear Stationary Connecting Support Bracket attached to the frame of the bike on both ends and supports the Sliding Support Bracket;

336) Rear Rod End Bearing connecting the rear end of the bridging rod to a location near the perimeter of the on-demand rotating Flywheel;

337) On-Demand Flywheel
a) One-way bearing clutch mounted on Flywheel;
b) Cam and Cam Follower mounted on the Upper Rear Axle and attached to the Flywheel;

338) Rear Mounted Upper Sprocket with chain or gear teeth located around its circumference;
a) Rear Mounted Upper Gear with gear teeth positioned around its circumference;

339) Upper Rear Axle over which both the Flywheel and Adjacent Driving Sprocket are mounted;

340) Attachment Bracket Connecting the Upper Rear Axle to the Frame of the Bicycle 341) Two Bearings Located Inside the Rear Axle Mounting Bracket and Upon Which the Upper Rear Axle Rotates;

342) Rotating Rear Lower Sprocket, With Chain or Gear Teeth positioned around its circumference, and attached to the Crank Axle on the Left Side of the Bicycle;
a) Rotating Rear Lower Gear, with gear teeth positioned around its circumference and attached to the Crank Axle of the Bicycle;

343) Chain rotating over Teeth located around the circumference of the Rear Upper Driving Sprocket and Crank Axle Driving Sprocket;

344) Right side mounted chain connecting the right front sprocket to the right the rear wheel sprocket or cassette;

345) Bottom Bracket and Shell through which the crank axle is inserted and positioned for rotation by rotational power being applied from either the rider's legs pumping the pedals, or from his pumping in curling action the Forearm/hand Bars as described in this invention; and 346) Rear bracket holding the rear end of the cable assembly in place on the Down Tube; also holding in place onto this Down Tube the rear Hub, and front end of the Rear Bridging Support Bar, upon which the front end of the Connecting Bridge Rod slides back and forth in unison with rotational pumping "up and Down" of the Forearm/hand Bars by the rider.

IV) Series 400—Upright Positioned Rider Forearm/Hand Bar System.

418) The Fulcrum Rod is attached at its center point to the Stem, and its rear arms can be positioned diagonally, or in some cases their geometric configuration is both diagonal and horizontal, as they trail in the direction of the upright sitting bicycle rider;

419) The Forearm/hand Bars are mounted above the Fulcrum Rod and consists of the following two primary components:
(a) Interior Forearm/hand Bars connected to the rear Hinge;
(b) A set of Exterior Forearm/hand Bars, mounted around the circumference of the Interior Forearm/hand Bars, and which can be moved "in or out" over the circumferential surface of Interior Forearm/hand Bars, and thus are adjustable to the rider's most comfortable upright riding position;
c) Forearm/hand bar adjustment locking-in-position mechanism, such as a spring-loaded pin. Both the Interior and Exterior Forearm/hand Bars have located in them adjustment apertures, into which the self-locking-pin may be manually positioned for the rider's most comfortable riding position;

420) Forearm/elbow Support Platforms located on top of the Forearm/hand Bars;

421) Hinges positioned at the rear ends of both the left side and right side Fulcrum Rods and Upper Interior Forearm/hand Bars, and connecting together the Interior Forearm/hand Bars with the Fulcrum rods. In addition to holding together these two sets of rods, these Hinges perform the function of being a fulcrum upon which the rear end of the Interior Forearm/hand Bars rotate over the U shaped Fulcrum, while the Forearm/hand Bars are being pumped "up and down by the rider;

422) Hand grips connected to the front of the Exterior Telescoping Upper Forearm/hand Bars and gripped by the hands of the rider while he pumps them "up and down' to cause a cyclical angular displacement of the Forearm/hand Bars; and 423) Rear mounted handles to assist riders, and particularly disabled riders, to have easy mounting access onto a Dual Power Bicycle; and 424) Yoke holding together the left and right Forearm/hand Bars and also providing an attachment mechanism for connecting the Forearm/hand Bars to the sliding Upper Front Telescoping Rod as the rider pumps them "up and down."

BRIEF DESCRIPTION OF THE DRAWINGS

FIG. 4b also shows the arc trajectory of the Rod Support Sleeve and Telescoping Rod, with the Forearm/hand Bars starting their pumping motion in the "down" position and ending in the "up" position;

In FIG. 8, the circumferentially located gear teeth on the Upper Rear Sprocket mesh directly into the circumferentially located gear teeth on the Crank Axle Sprocket.

DETAILED DESCRIPTION OF EMBODIMENTS OF THE INVENTION

In the following description and accompanying drawings, like numbers refer to like parts whenever they occur.

Figure 4A:
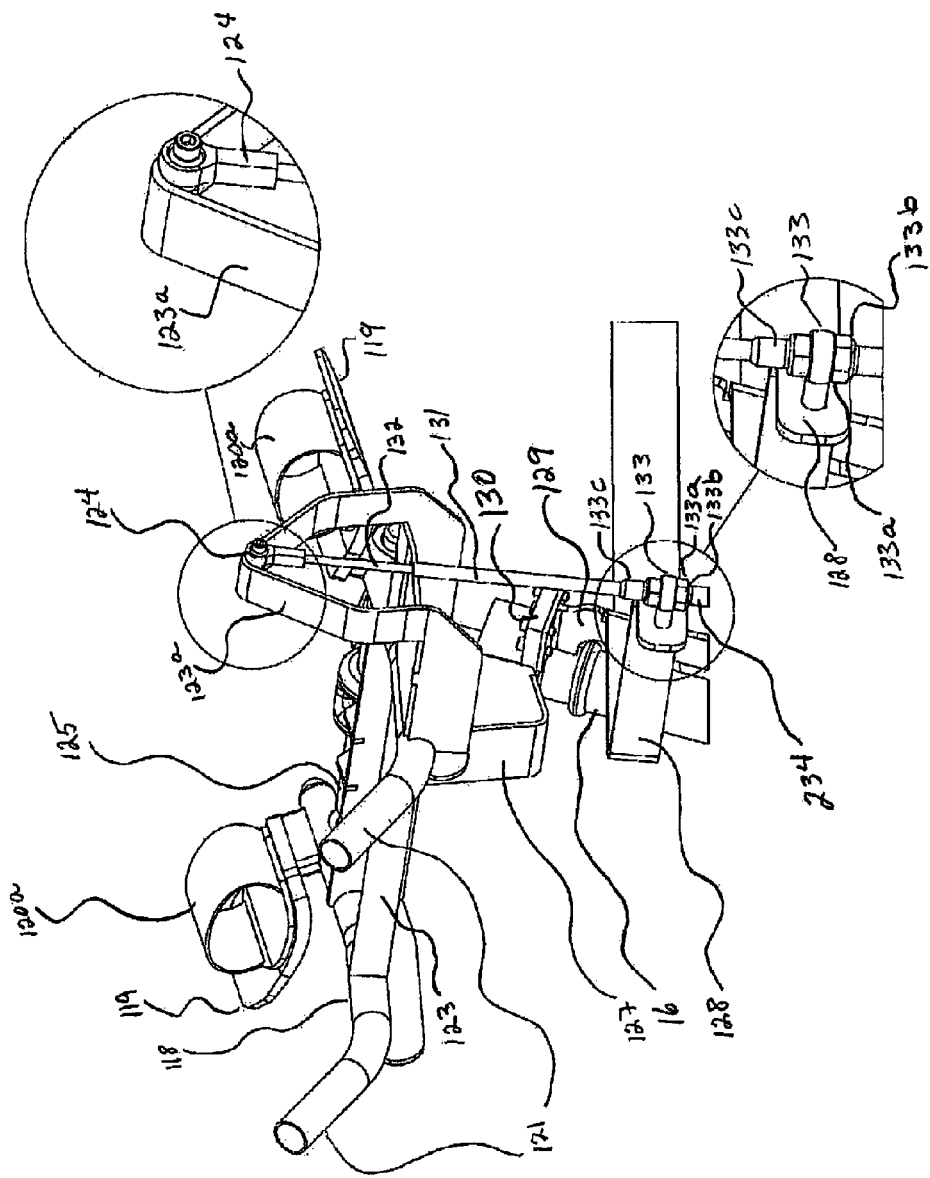
FIG. 4(a) is both a perspective view of the on-demand pumping Forearm/hand Bar apparatus, including the on-demand pumping Forearm/hand Bars, and their connection with the rotating Upper Rod End Bearing and Upper Telescoping Rod that moves "in and out" of its Upper Support Sleeve. The following additional components make-up the upper front components of this invention: Hub, Upper Support Platform, and Rod End Bearing. Attached to the lower end of the Upper Front Hub is an External Stationary Flexible Cable Sheath containing inside of it the Internal Flexible Sliding Cable. The Upper Front Hub is affixed to the Upper Support Platform. The Upper Support Platform permits the Hub to stay stationary to the forks of the bicycle while the Support Sleeve, Telescoping Rod and upper end of the Sliding Cable oscillate back and forth in unison with the rotational pumping Forearm/hand Bars. The arc shaped pumping Forearm/hand Bars and attendant component parts are in the "down" position.
Figure 4B:
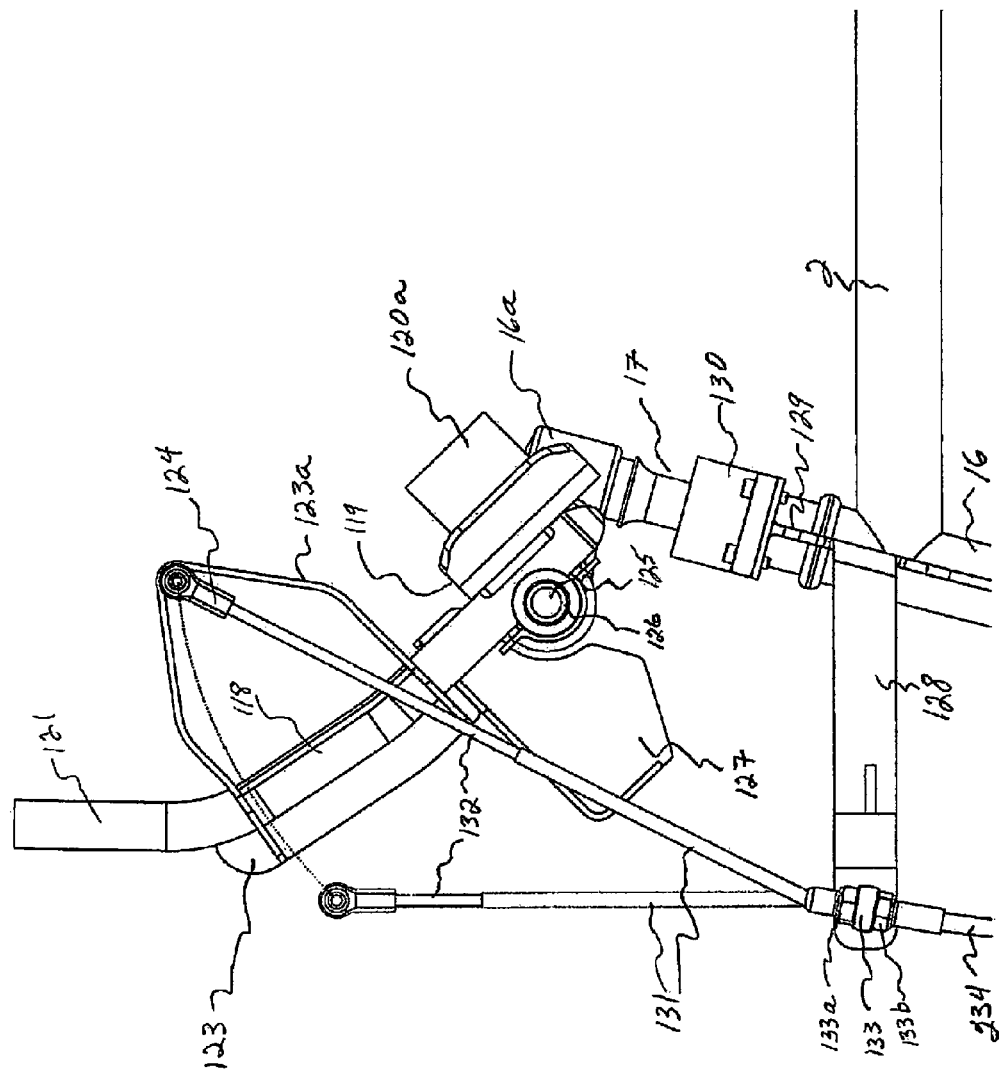
FIG. 4(b) is a side view of the rotational pumping Forearm/hand Bars and attendant component parts described in FIG. 4 (a), except that the pumping Forearm/hand Bars and attendant component parts are extended in the full "up" position.

The Dual Power Bicycle consists of Bicycle Frame 1, and has attached to its Turning Tube 17 a perpendicularly mounted Fulcrum Rod 125. This Fulcrum Rod 125 serves two purposes, a) provides the rider with the ability to steer the front wheel 6 of the bicycle with his forearms and hands by causing the Turning Tube 17 to naturally steer right or left when he turns it with the Forearm/hand Bars 118, which are attached to the Fulcrum Rod 125, and b) permits the rider to simultaneously input 100% of his power into the Crank Axle 13 from rotationally pumping "up and down" the Forearm/hand Bars 118. The Fulcrum Rod 125 has on each end of it a Bearing 126, and attached to each of these Bearings 126 is the rear end of one of two Forearm/hand Bars 118. Thus, as the rider "pulls-up and pushes-down" the Forearm/hand Bars 118, the rear end of each of these Forearm/hand Bars 118 pivots on the Fulcrum Rod 125 and Bearings 126, causing a cyclical angular displacement of the Forearm/hand Bars 118 as they move lineally along the path of an arc. The path of this arc is determined by both a) the radius of the distance from the Fulcrum Rod 125 to the point of attachment of the Rod End Bearing 124 and the Forearm/hand Bars 118 and b) the lineal distance of vertical and angular travel of the Forearm/hand Bars;

The Forearm/hand Bars are connected together with a Yoke 123. The function of the Yoke 123 is to tie together the two Forearm/hand Bars 118 so that they can only move together in unison, one with the other, rotationally "up and down", or left or right. Thus, the rider has the ability to move the Forearm/hand Bars 118 rotationally "up and down" by themselves, turn the front wheel 6 left or right while simultaneously pumping the Forearm/hand Bars 118 in an arc shape "up and down", or turn the Bike left or right without pumping them 118. Part of the Yoke 123 is an Upper Yoke/Telescoping Rod Attachment Bracket 123a, which connects the Yoke 123 to an Upper Front Rod End Bearing 124, which in turn is connected to the outer end of the Upper Front Telescoping Rod 132 of the Upper Drive System 100. This Telescoping Upper Front Rod 132 slides "up and down" through the Upper Front Telescoping Rod Support Sleeve 131, which also guides the lineal vertical travel of this Upper Front Telescoping Rod 132. Thus as the rider grips the Hand Grips 121, and rotationally pumps the Forearm/hand Bars 118 "up and down", he causes the Telescoping Upper Front Rod 132 to travel lineally and vertically the same lineal distance and direction as the travel and movement of the Forearm/hand Bars 118 through its arc, as illustrated in FIG. 4b.

Figure 5A:
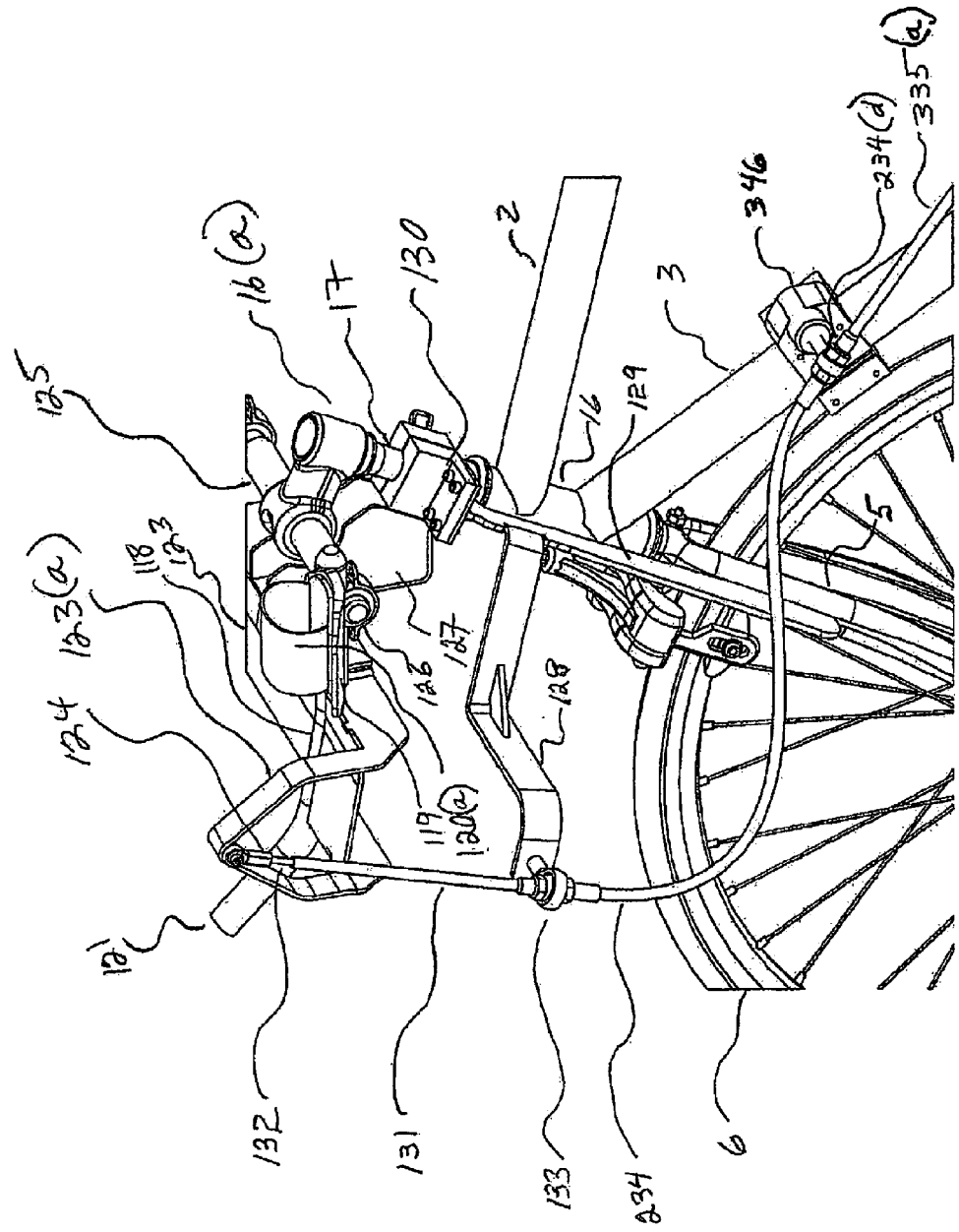
FIG. 5(a) is a perspective view of an example of an External Flexible Cable Sheath that is attached and located so that its upper front end is stationary to the Front Forks, and its lower rear end is attached and positioned so that the Sheath's rear end remains stationary, and is attached directly or indirectly to the frame of the Bicycle. This External Stationary but Flexible Cable Sheath contains inside of it a Flexible and Sliding Cable.
Figure 5B:
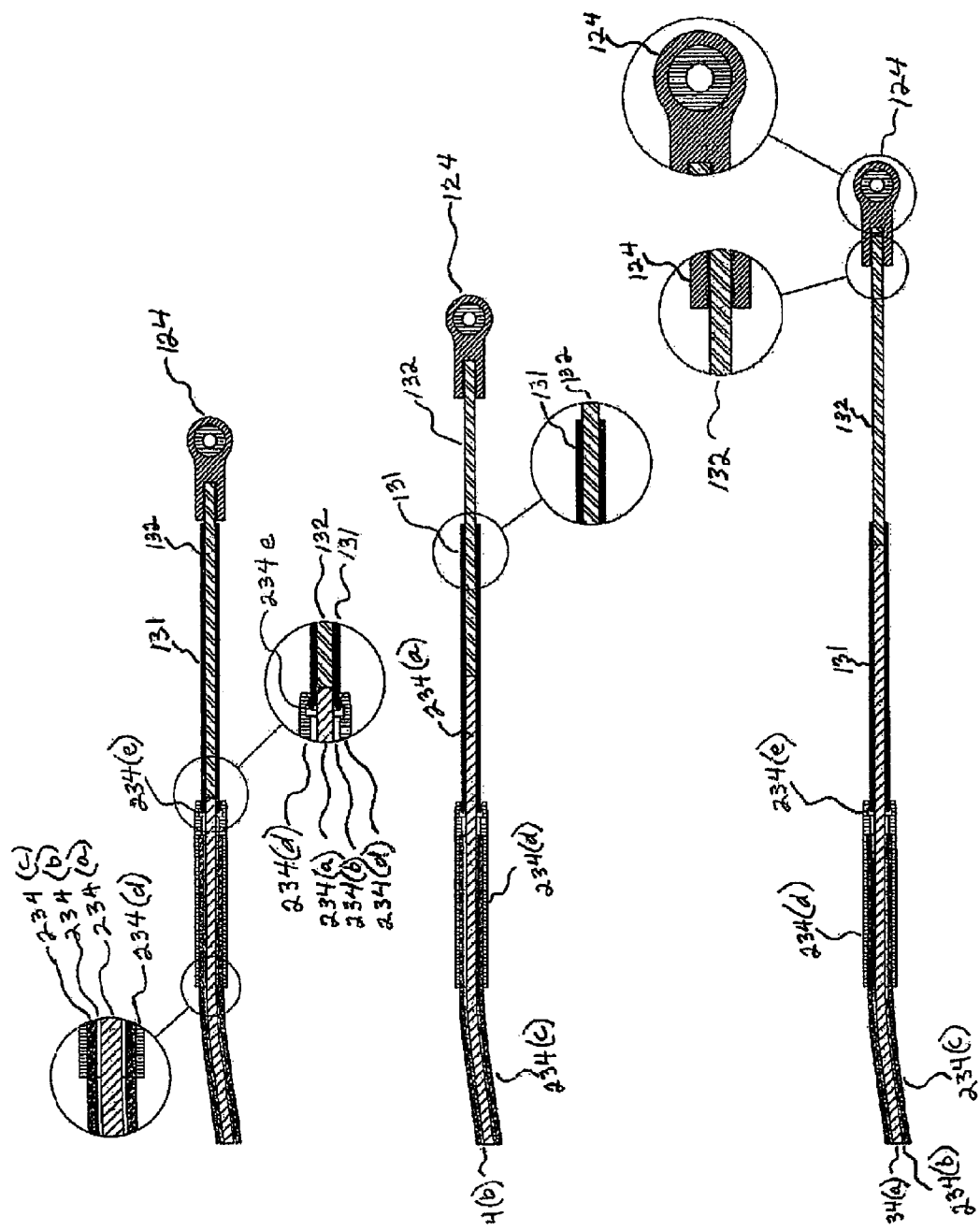
FIG. 5(b) is a cross-section view of an example of a Flexible Cable System that may be used with this invention. Each of the views shows that the Flexible Cable Assembly may contain, but does not need to contain, all of the following component parts: flexible cable, hub, support sleeve for the telescoping rod, telescoping rod. The end of the Sliding Flexible Cable is shown attached to the interior end of the Telescoping Rod. The views also show the telescoping rod in the full "in", partial "out", and full "out" positions, which correspond to some of the telescoping rod positions in their various locations during each pumping cycle by the rider performing a curling action with the Forearm/hand Bars. Detail views of the junction of the Hub with the sheath containing the flexible moving cable, junction of the hub and rod support sleeve, junction of the orifice of the outer end of the rod support sleeve and a partially extended telescoping rod, as well as a fully extended telescoping rod attached to the rod end bearing are also shown. Also illustrated is the open space area at the location in the rear end of the hub where the internal end of the oscillating rod support sleeve is connected to the rear end of the hub.
Figure 5C:
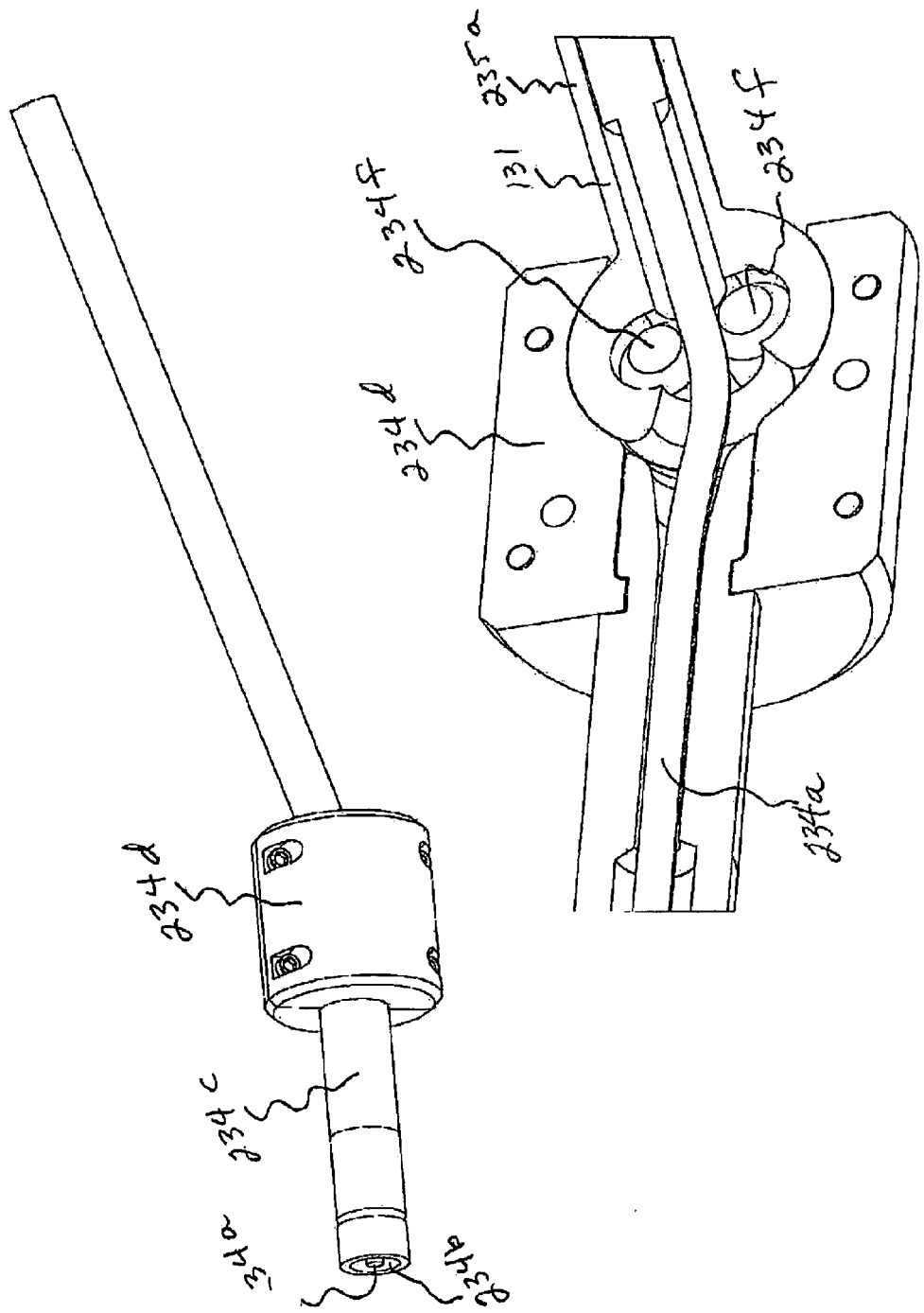
FIG. 5(c) is a cutaway view of a Hub End Cap and Support Tube that contains two rollers, with grooves notched into the rollers to guide the sliding cable. It also shows an exterior view of the Hub, Cable Assembly, and Support Tube.
Figure 6:
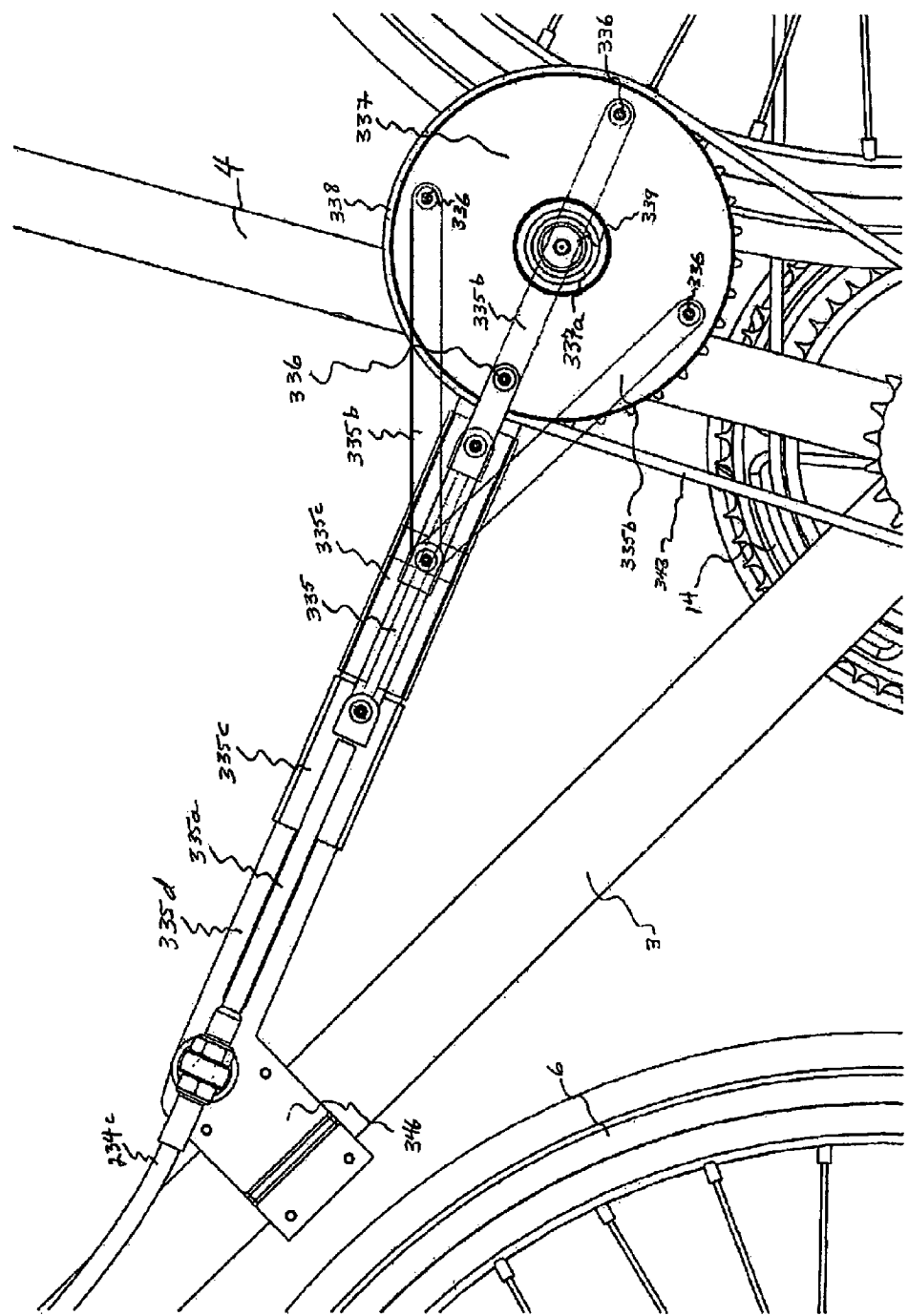
FIG. 6 illustrates a side view of components used in the invention's Lower Rear Drive System that directly convert 100% of the lineal pumping power from the pumping Forearm/hand Bars (less friction loss from the bearings and sliding cable) into rotational power and movement of the Flywheel and Rear Upper Sprocket. These component parts include the rear end of the External Stationary Flexible Cable attached to the Down Tube, Rear Hub, Rear Rod Support Sleeve, Telescoping Rod with its external rear end attached to the front end of the sliding and oscillating Connecting Bridge Rod, Sliding Support Bracket that supports both the rear end of the Telescoping Rod and front end of the sliding and oscillating Connecting Bridge Rod. The rear end of the Sliding Connecting Bridge Rod is affixed to the Rear Rod End Bearing. This Bearing connects the lineal moving and oscillating bridge rod to the rotating Flywheel, which contains a one-way bearing.

It is recognized that the specific components of the Push/Pull Cable System shown in FIG. 5b are by example only, and that some of the primary components and geometric locations for the Cable System in this invention consist of an External Stationary but Flexible Cable Sheath 234c which contains inside of it a Sliding Flexible Cable 234a. Because the lower end of the Telescoping Upper Front Rod 132 is attached directly to the Upper Front end of this Flexible Sliding Cable 234a, for example by swaging, this Flexible Sliding Cable 234a travels in unison with the "up and down" movement of the Telescoping Upper Front Rod 132. The Sliding Flexible Cable 234a shown in FIG. 5b, then slides through its External Stationary but Flexible Cable Sheath 234c, and is directly attached at its lower rear end to the Lower Telescoping Rod 335 of the Lower Drive System 300. The method of attachment may, for example, be by swaging. Thus, as each end of the Flexible Sliding Cable 234a slides lineally "in and out" of the Exterior Stationary But Flexible Cable Sheath 234c, in conjunction with the simultaneous arc shaped pumping of the Forearm/hand Bars 118 by the rider, it causes the Rear Telescoping Rod 335 to also move lineally "in and out" of its Lower Rear Support Sleeve 335a, as shown in FIG. 5b and FIG. 6. The efficiency of "back and forth" movement of the Sliding Flexible Cable can be improved by using a lubricant between the Sliding Flexible Cable and the Stationary but Flexible Sheath. A lubricant located between the Flexible Cable and Hubs, as well as between Flexible Cable and Support Tubes, will also improve the efficiency of the Cable System. The back end of the Lower Rear Telescoping Rod 335 is connected to the front end of Rear Bridging Rod 335b. The back end of the Lower Rear Connecting Rod 335b is in turn attached to the Flywheel 337 at a location near the circumference of the Flywheel 337. Thus as this Lower Rear Connecting Rod 335b is moving "back and forth" in unison with the "in and out" power strokes from the Lower Telescoping Rod 335, it causes the attached Flywheel 337 to rotate. The rotation of the Flywheel 337 then makes the Rear Connecting Bridge Rod 335b oscillate "up and down" with each rotation of the Flywheel 337.

Figure 4C:
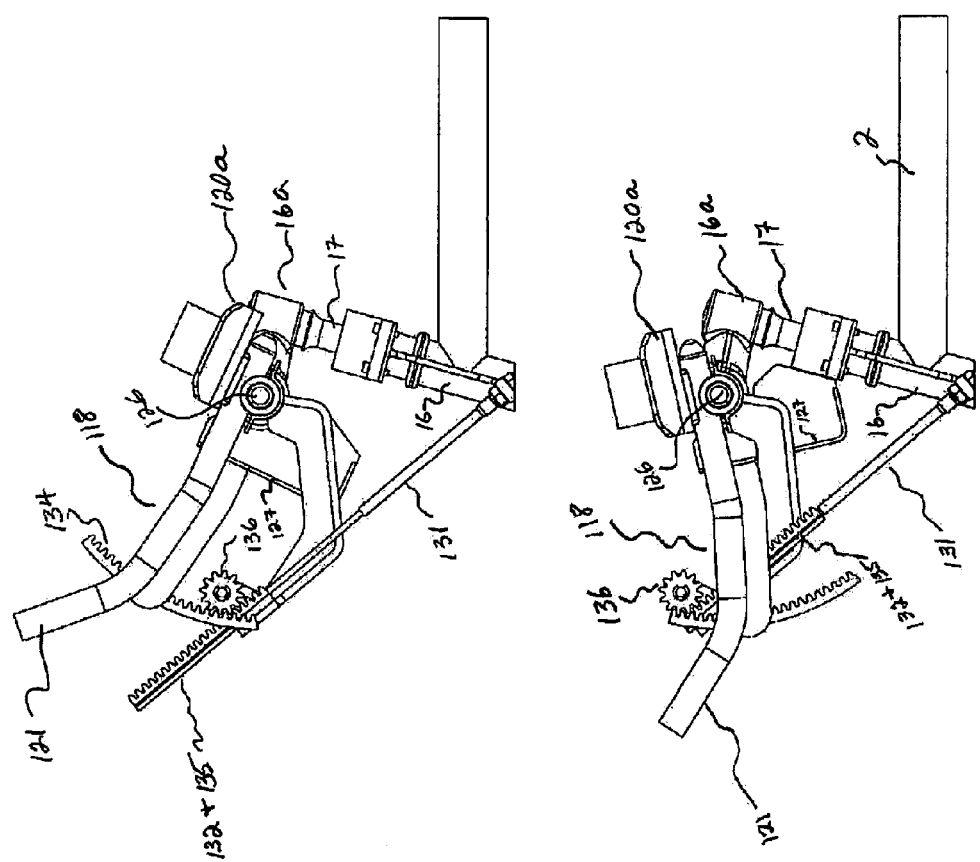
FIG. 4(c) is a side view of an alternative design for the Upper Drive System in which there is added one Rack, designed in the shape of the arc, an example of which is shown in FIG. 4(c), a Stationary Pinion Gear, and a second Rack that is straight and positioned concurrent with a line extending in a forward plane from the Lower Support Sleeve and Sliding Connecting Rod Bracket. The teeth of this Pinion Gear are meshed into the teeth located on each Rack. As the Rack in the shape of an arc cycles "up and down", it causes a similar cycling rotation of the Pinion Gear. As the Pinion Gear rotates "back and forth" it causes the straight shaped Rack to also cycle "back and forth", which in turn causes the Flexible Sliding Cable to slide "back and forth" inside its Stationary But Flexible Sheath.
Figure 6A:
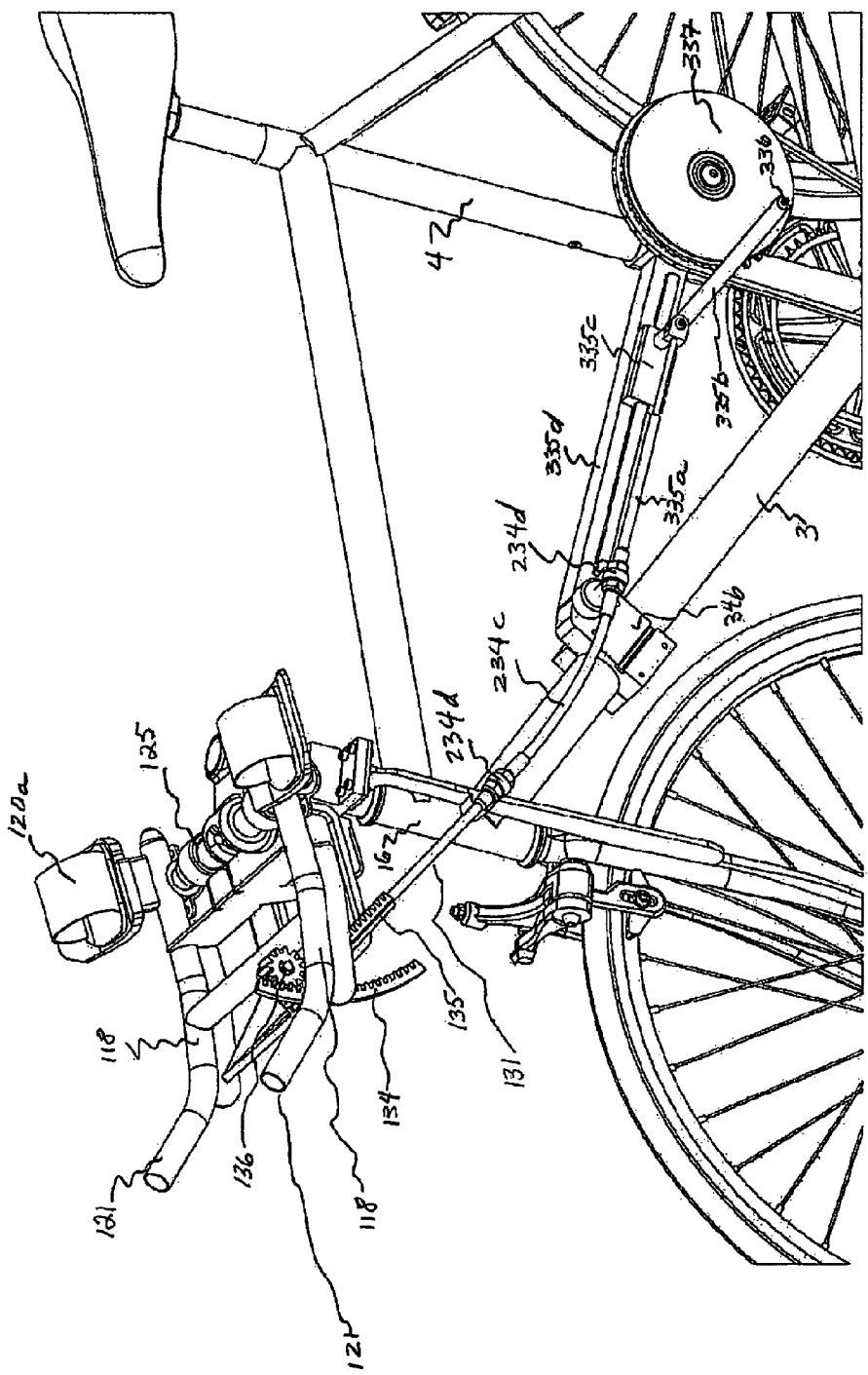
FIG. 6(a) illustrates a side view perspective of the Dual Power Bicycle utilizing the two racks and one pinion as the connecting mechanism between the arc shaped pumping Forearm/hand Bars and the front external end of the Upper Forward Telescoping Rod. The Straight Rack is powered "back and forth" as a result of the Arc Shaped Rack rotating the Pinion Gear "back and forth" in unison with the rider pumping the Forearm/hand Bars "up and down" in the shape of an arc. The Flexible Sliding Cable is then moved "back and forth" in unison with the Upper Front Telescoping Rod. The Crank Axle is also simultaneously rotated as described in the Enablement of this Patent Application.

As the rider is working and pumping the Hand Grips 121 of the front end of the Forearm/hand Bars 118 rotationally "up and down", the rear ends of these bars 118 are pivoting on their Bearings 126 over the Fulcrum Rod 125, which is attached to the Turning Tube 17. Because the Yoke 123 is pulling the front Upper Telescoping Rod 132 in the Upper Drive System 100 "up and back" toward the rider, the upper end of the Telescoping Rod 132 is traveling along a vertical line that is in the shape of an arc, as illustrated in FIG. 4b. While the Telescoping Rod 132 is moving "in and out" of its Support Sleeve 131, this Support Sleeve 131 is also oscillating "forward and backward" with each pumping cycle. The base of this Telescoping Rod Support Sleeve 131 is affixed to the upper end of the Upper Front Stationary Hub 133c, which in turn is attached to the Stationary Front Platform 133. During the cyclical angular displacement of the pumping of the Forearm/hand Bars 118 over the Fulcrum 125, an arc is formed with the angular travel of the Upper Support Sleeve 131 and its Telescoping Rod 132. This is shown in FIGS. 4a and 4b, wherein the arc starts at a location in which the Forearm/hand Bars 118 are in the "down" position. This arc line travels to a point wherein the Forearm/hand Bars 118 are in their most "up" position, as illustrated in FIG. 4b;

Because all three components, comprised of the Upper Front Support Tube 131, Upper Front Flexible Sliding Cable 234a, and Upper Front Telescoping Rod 132, oscillate along the circumference of the arc created by the rider pumping the Forearm/hand Bars 118, a set of Grooved Rollers 234f can be added into the rear housing of the End Cap to the Upper Front Hub 234d. The Sliding Flexible Cable 234a is then able to smoothly slide "in and out' of the Upper Front Hub 133a and Support Tube 131 without being abraded by friction or balling-up like a bird's nest during the rider's Forearm/hand Bar 118 curling action strokes as shown in FIGS. 5c, 5a, 5b and 4b;

To implement an alternative design for connecting the Forearm/hand Bars 118 to the external end of the Telescoping Front Rod 132, two racks 134 and 135 and one Pinion Gear 136 can be used, as shown in FIG. 6a. The vertically positioned Rack 134 is designed in the shape of an arc. The dimensions of the arc are defined by the lineal distance of travel of the Forearm/hand Bars 118 as they are rotationally pulled "up and down" by the rider, as well as its distance away from the Forearm/hand Bars. 118. The Pinion Gear 136 is located above the Front Wheel 6, and directly below the arc shaped Rack 134. The second Rack is straight 135, and the back end of this Straight Rack 135 is attached to the external front end of the Upper Front Telescoping Rod 132. The gears of both Racks 134 and 135 are engaged into the gears of the Pinion Gear 136, as shown in FIG. 4c. Thus, as the Forearm/hand Bars 118 are pulled "up and down" in an arc shape by the rider, the vertical Arc Shaped Rack 134 moves in unison "up and down". This causes the Pinion Gear 136 to rotate in unison with the vertically oscillating Arc Shaped Rack 134. Because the gears of the Straight Shaped Rack 135 are also engaged into the gears of the Pinion Gear 136, the "up and down" rotation of this Pinion Gear 136 causes the Straight Shaped Rack 135 to oscillate "back and forth" in unison with its rotating Pinion Gear 136. Because the rear end of this Straight Shaped Rack 135 is attached to the front external end of the Upper Front Telescoping Rod 132, this causes the Sliding Flexible Cable 234a to slide "back and forth" inside its External Stationary But Flexible Sheath 234c, and thus transfer the rider's rotational Forearm/hand power into the Rear Telescoping Rod 335 and Connecting Bridge Rod 335b as shown in FIGS. 4c, 6, 6a and 7a.

The rear end of the Connecting Bridge Rod 335b of the Lower Drive System 300 is affixed at a point near the circumference of the on-demand Flywheel 337, which rotates on its Upper Rear Axle 339. The Connecting Bridge Rod 335b is attached to the on-demand Flywheel 337 through the use of a Rear Connecting Rod End Bearing 336. In this way, as the Flexible Cable 234a moves "in and out", it causes the Lower Telescoping Rod 335 and Connecting Bridge Rod 335b to move the Rear Rod End Bearing 336 the same lineal distance as the travel of the Internal Flexible Sliding Cable 234a. Because the Rear Rod End Bearing 336 is attached to the Flywheel 337 near its circumference, it causes the Flywheel 337 to rotate in unison with the rotational movement from the rider pumping the Forearm/hand Bars 118 "up and down". In this way, the invention has converted the rotational/linear/vertical movement of the pumping Forearm/hand Bars 118 into rotary motion of the Flywheel 337 on its Upper Rear Axle 339. A second advantage of this section of the invention is that the dynamics of these components transfer 100% of the power (less friction from several bearings and sliding cable) from use of the rider's relevant upper body and arm muscle into rotation power to turn the rear Flywheel 337 as described above. The desired attribute by this invention of changing lineally moving energy created from the rider rotationally pumping the Forearm/hand Bars 118 "up and down" into rotary power delivered into the circularly turning crank axle 13 is shown in FIGS. 6, 6a and 7a and the various positions of the Connecting Bridge Rod 335b attached to the rotating Flywheel 337.

Mounted onto the same Upper Rear Support Axle 339 as the Flywheel 337 is an Upper Rear Sprocket 338. This Sprocket 338 has teeth for a Chain 343 to be mounted around its circumference. The Chain 343 is then placed over these Teeth 338. This Sprocket 338 is located directly adjacent to the Flywheel 337 and located closer to the Bicycle Frame 1 as shown in FIG. 7a. Because the Flywheel 337 and Sprocket 338 are mounted and attached to the same Upper Rear Axle 339, when the Flywheel 337 is turned from power provided by the rider's pumping of the Forearm/hand Bars 118 in the shape of an arc, it automatically turns the Upper Rear Axle 339 upon which the Flywheel 337 and Upper Rear Sprocket 338 are affixed. This is illustrated in FIGS. 6a and 7a. Because the Upper Rear Axle 339 connects together both the Flywheel 337 and Upper Rear Sprocket 338, when the Flywheel 337 is turning, it transfers this same amount of rotational power from the rider pumping the Forearm/hand Bars 118, in the shape of an arc, directly into the adjacent Upper Rear Sprocket 338. The Chain 343 mounted on the circumferentially located teeth of this Sprocket 338 is then rotated in the same rotary direction that its Sprocket 338 is turning, and with the same amount of power inputted to it. This is shown in FIG. 7a.

Located directly below, or in-line with this Upper Rear Sprocket 338, is a Lower Rear Sprocket 342 that is directly connected to the Crank axle 13 of the Bicycle 1. This Lower Rear Sprocket 342 also has teeth for a chain that rings its circumference. The Chain 343 is then mounted over the teeth of both the Upper Rear Sprocket 338 and the Lower Rear Sprocket 342. In this way, as the Upper Rear Sprocket 338 rotates, it automatically is turning its Chain 343, which in turn rotates and powers the Lower Rear Sprocket 342 and Crank Axle 13 to which the Lower Rear Sprocket 342 is attached. In this way, nearly 100% of the power from the rider's rotational/linear/vertical pumping of the Forearm/hand Bars 118, is transferred into the rotating Crank Axle 13.

Figure 7A:
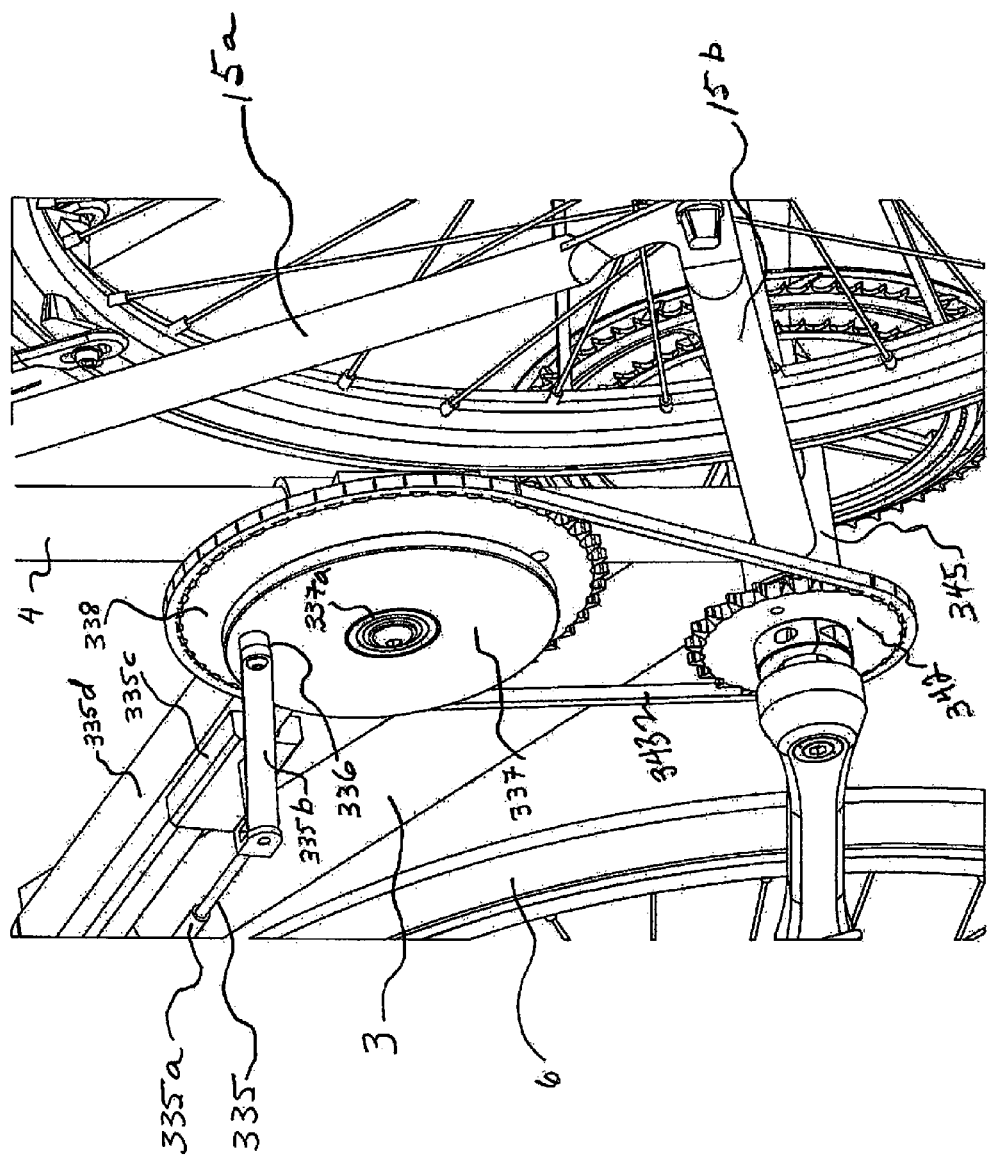
FIG. 7(a) is a forward looking perspective view of the rotating assemblies that complete the conversion of lineal moving "in and out" power strokes from the Lower Rear Telescoping Rod, through the Oscillating Bridge Rod and culminating into rotational power inputted to the Crank Axle, thereby powering the Bicycle forward. The basic components of FIG. 7(a) include the Rear Rod Support Sleeve to guide and contain the "in and out" moving Telescoping rod and Flexible Sliding Cable attached to this Telescoping Rod, Connecting Sliding and Oscillating Bridge Rod that connects the rear end of the Telescoping Rod to the Rear Rod End Bearing, Support Bracket that provides stability to this Sliding and Oscillating Bridge Rod, Rear Rod end Bearing, one-way Bearing Clutch mounted on the Flywheel, Upper Rear Sprocket with chain teeth around its circumference, Lower Rear Crank Sprocket attached to the Crank Axle, chain meshing with the teeth located around the circumference of both the Upper Rear Sprocket and Crank Axle Sprocket, and Crank Axle traversing the inside of the Bottom Bracket of the Bicycle.
Figure 7B:
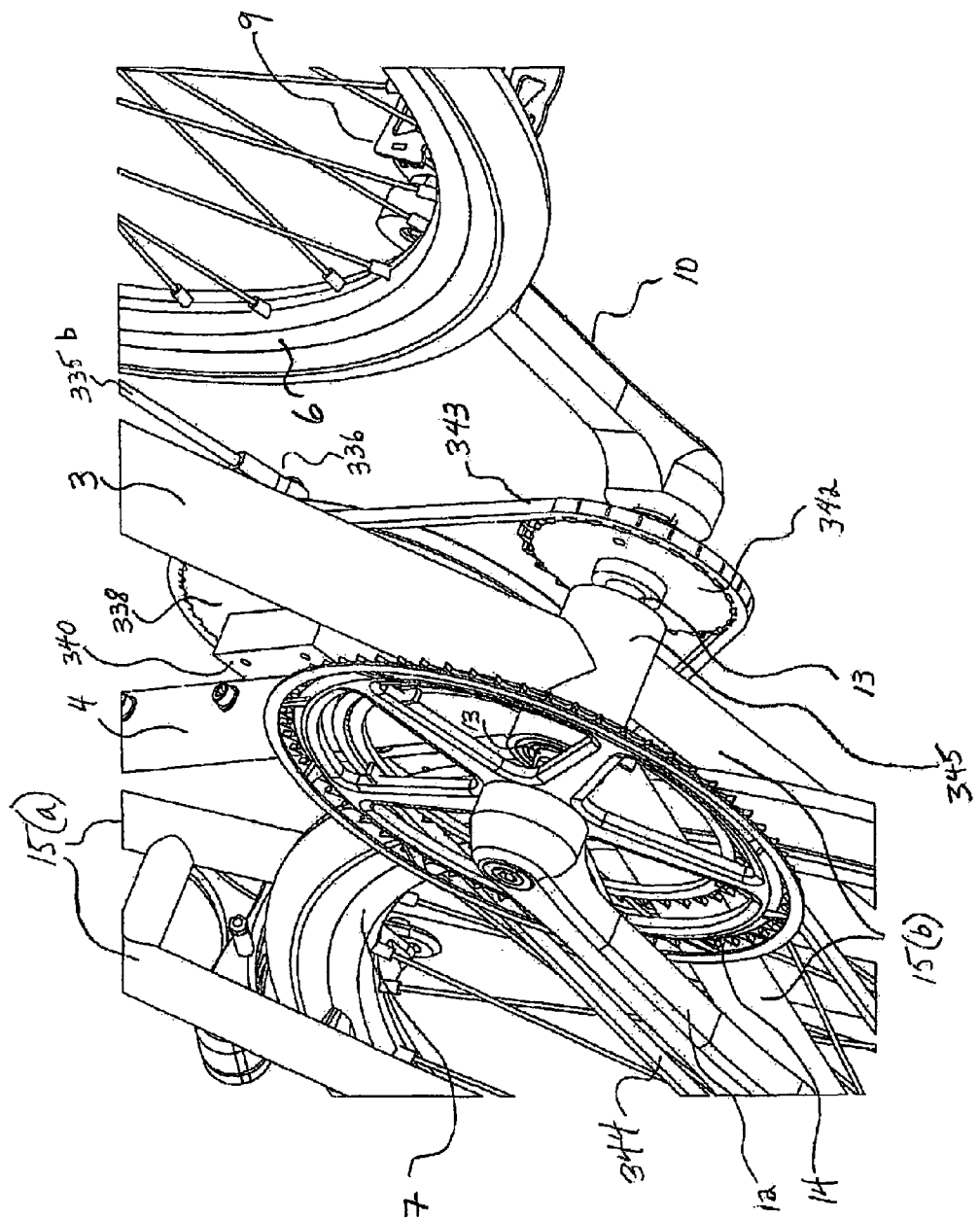
FIG. 7(b) illustrates the direct and solid connection of the Bicycle's left-hand mounted Crank axle Sprocket to the bicycle's Crank Axle, now able to be rotated under Dual Power provided by both the arms and legs of the rider.
Figure 7C:
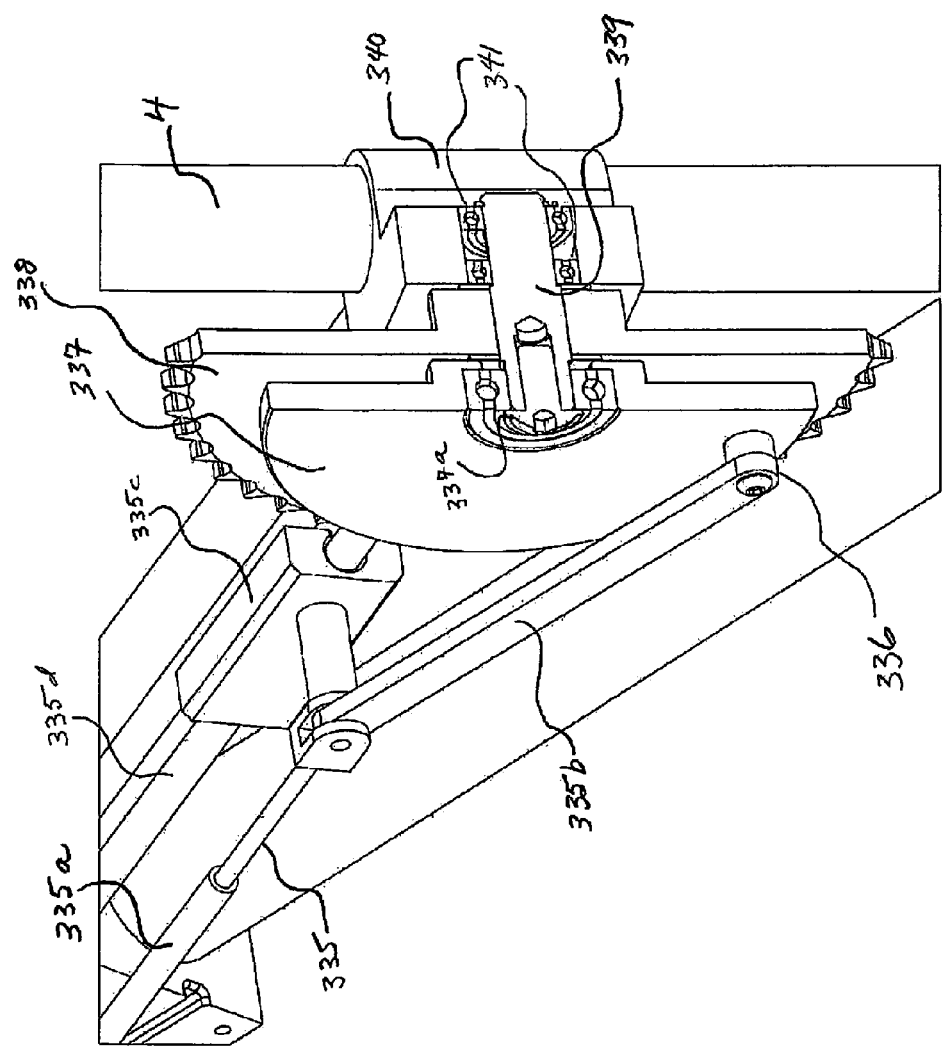
FIG. 7(c) is a cutaway drawing of the Flywheel and one-way Bearing Set, Upper Rear Sprocket, Upper Rear Axle upon which these two components rotate, and Upper Rear Bracket and Internal Bearing Set attached directly to the bicycle frame in a stationary position relative to the frame. It also shows an example of one of the bicycle frame components, the Seat Tube, to which this Upper Rear Axle may be attached.
Figure 7D:
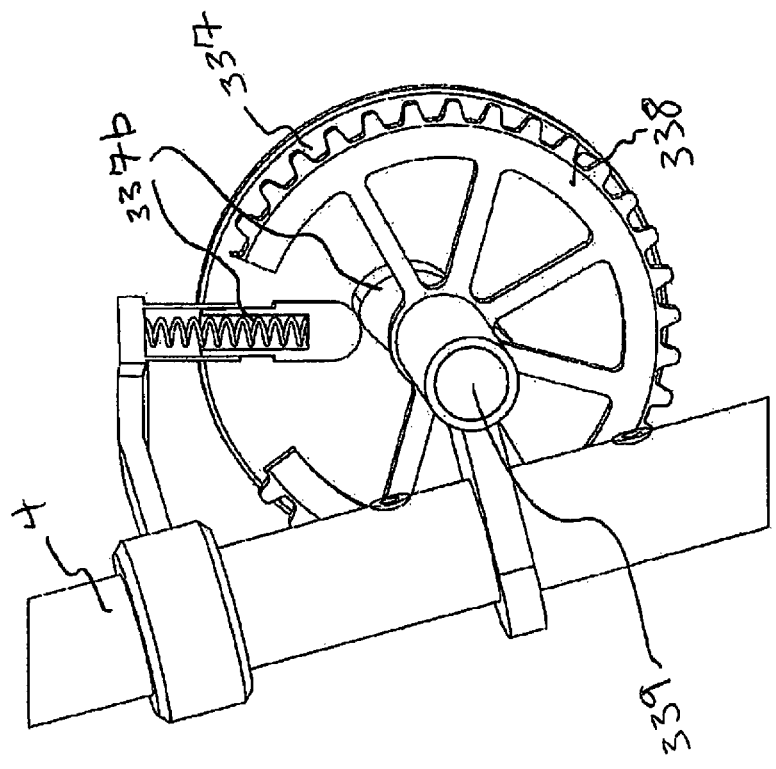
FIG. 7d is a perspective view of the cam and cam follower.
Figure 7D:
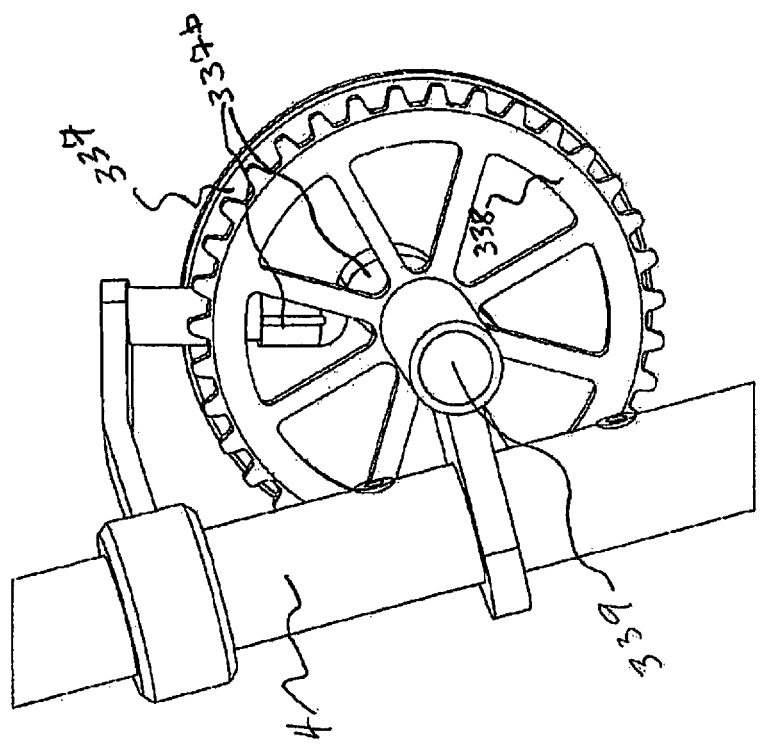

In order to use the afore-described invention as an on-demand source of power by the rider, a one-way Bearing Clutch Assembly 337a is installed on the Flywheel 337 as shown in FIGS. 7a and 7c. When the one-way Clutch 337a is installed on the Flywheel 337, then as the rider pedals his legs, turning the Crank Axle 13, no power from rotational vertical travel of the Forearm/hand Bars 118 will be transferred into the rotating Crank Axle 13 until the revolutions per minute (RPM) of the Flywheel 337 are equal to the revolutions per minute (RPM) of the Crank Axle 13. At that point, Dual Power starts to be supplied into the Crank Axle 13 from two sources: a) the first power source is from the rider rotationally pumping the Forearm/hand Bars 118 in a curling action with his arms; and b) the second source of power comes from the rider simultaneously pumping his legs in a circular pattern on the Pedals 9. The faster and harder the rider rotationally pumps the Forearm/hand Bars relative to turning the Pedals 9 through pumping his legs, the more relative power is inputted into the Crank Axle 13 by the rider's arm power than by leg power. In order to push the flywheel 337 over its top dead center position while the rider is rotationally pumping the forearm/hand bars 118, a cam and cam follower 337b can be used, as shown in FIG. 7d.

Figure 8:
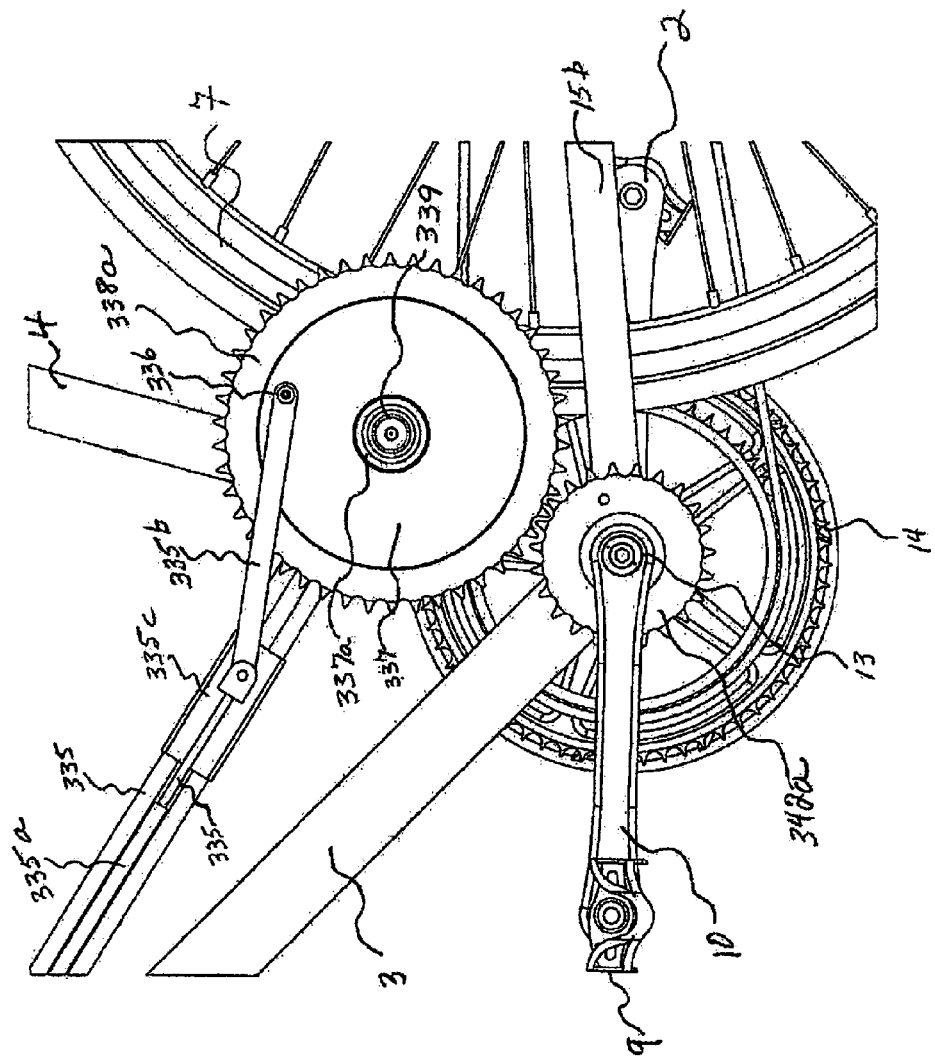
FIG. 8 is a side view of an alternative method for transferring the energy from the rotating Upper Rear Sprocket directly into the Lower Rear Crank Axle without using a chain.

An alternative means for transferring the rotational power from the Upper Rear Sprocket 338 into the Crank Axle 13, without the use of a Chain 343, is to have gear teeth, instead of chain teeth, located around the circumference of both the Upper Rear Gear 338a and the Crank Axle Gear 342a. In this configuration, the Upper Rear Gear 338a is located above the Crank Axle Gear 342a, with the gear teeth of both gears 338a and 342a engaged one into the other. The rider rotationally pumps the Forearm/hand Bars 118 and transfers this lineal power through the Cable System to the Upper Rear Gear 338*a*, this power will be inputted into the gear teeth located around the circumference of the Crank Axle Sprocket 342*a*, and cause it to rotate. Because the Crank Axle Gear 342*a* is attached directly onto the Crank Axle 13, 100% of the rotational power from the pumping Forearm/hand Bars 118 will be turned into rotary power and turn the Crank Axle 13. This is illustrated in FIG. 8. According to embodiments, the lower telescoping rod maybe coupled to the gear or sprocket by use of a Flywheel.

Figure 1:
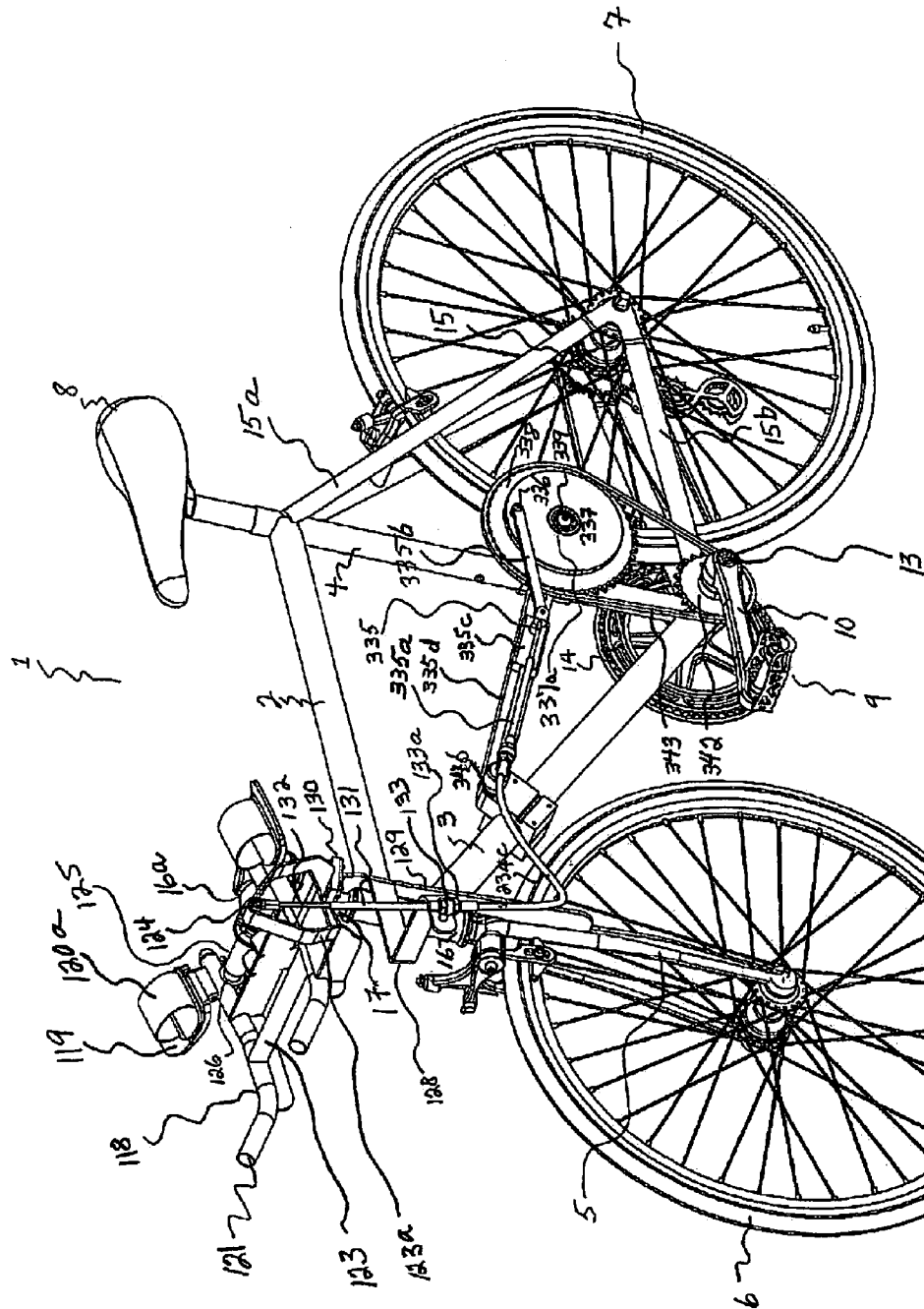
FIG. 1 is an oblique frontal perspective view of an example of a Dual Power Bicycle in which the rider uses both arms and legs at the same time to power this three system drive and designed according to the enablement of this invention; these three systems consist of Upper Drive System, Power Transfer and Steering Cable System, and Lower Rear Drive System.
Figure 2A:
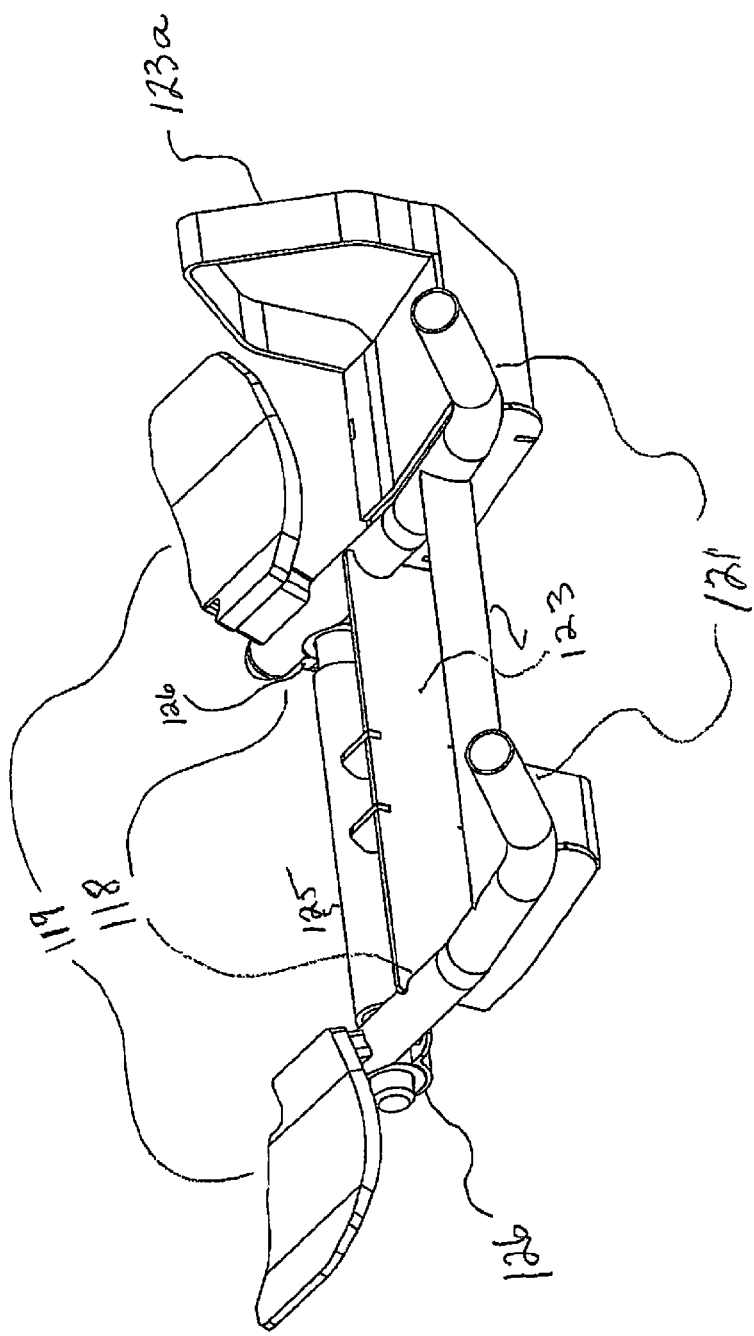
FIG. 2(a) shows a perspective view of the on-demand pumping Forearm/hand Bars without any means for affixing the forearms or elbows of the rider to the Forearm Support Platforms mounted on each pumping Forearm/hand Bar.
Figure 2B:
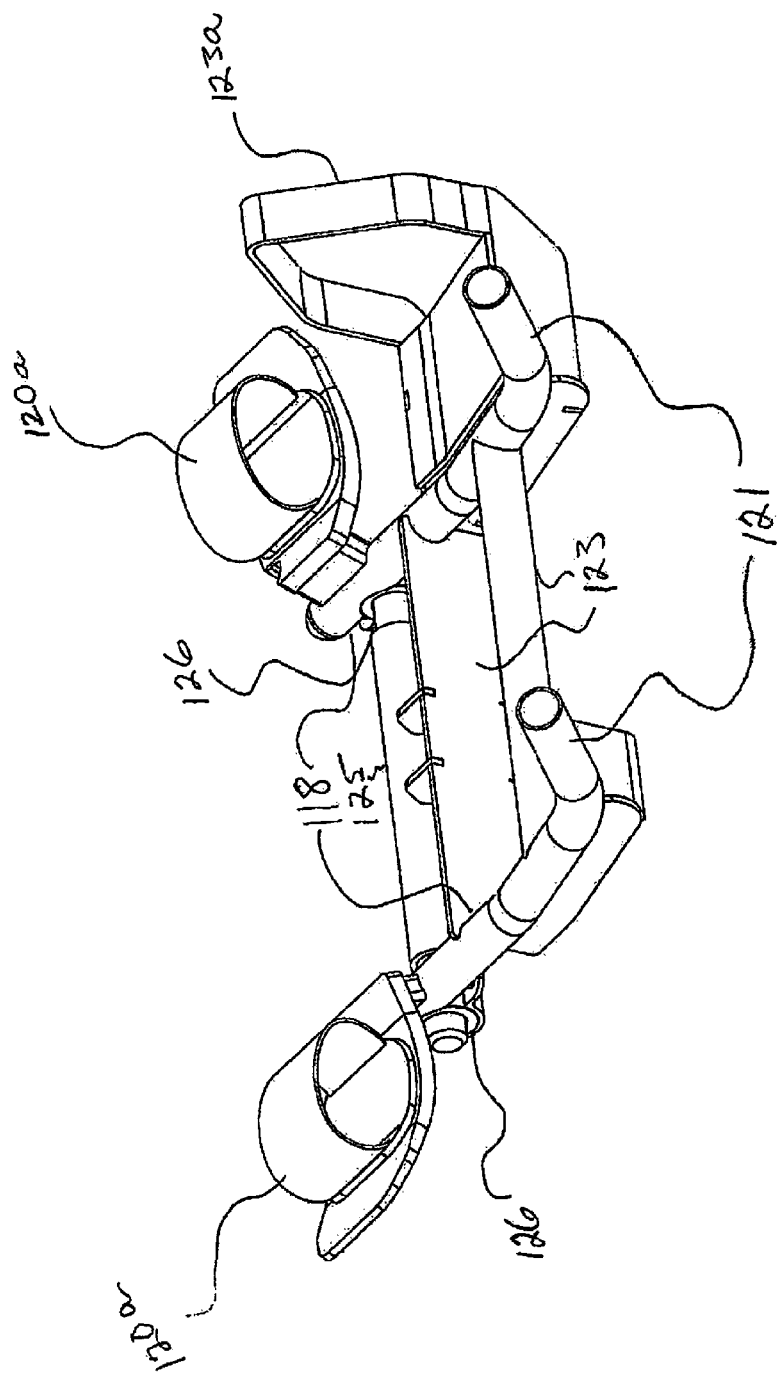
FIG. 2(b) shows a perspective view of a set of on-demand pumping Forearm/hand Bars with a means for attaching the rider's forearms to the on-demand pumping arm bars such as a strap of textile, for example Velcro.
Figure 2C:
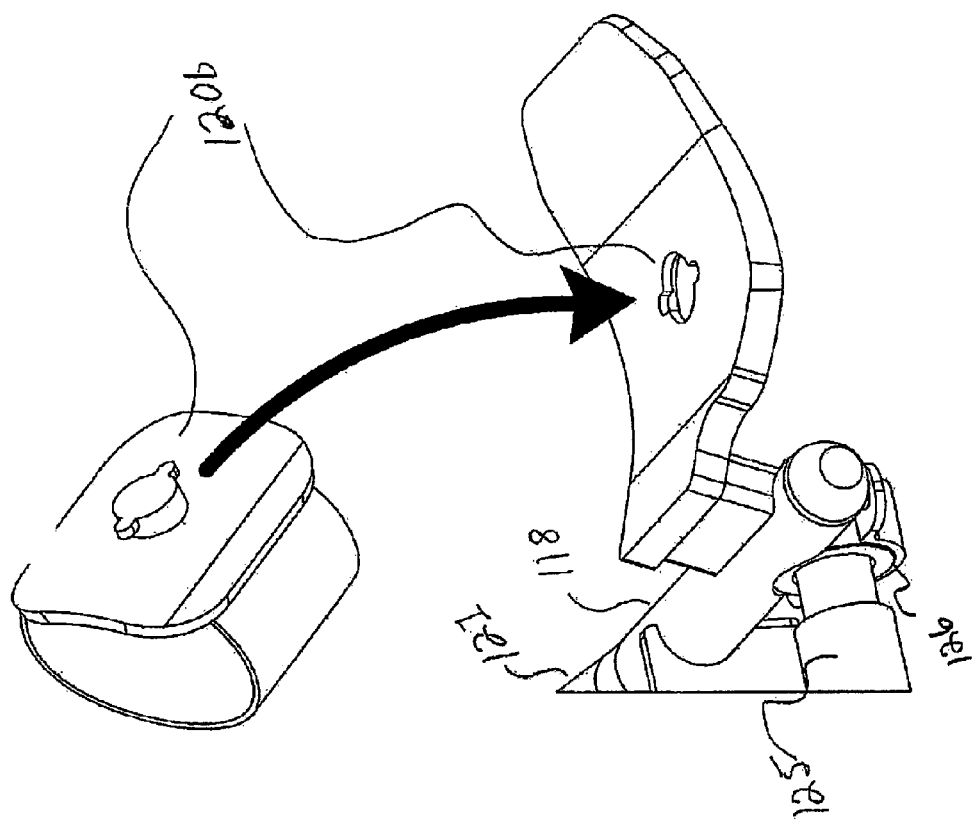
FIG. 2(c) shows a perspective view of the on-demand pumping Forearm/hand Bars with Break-away Connectors; the Break-a-way Connectors are attached to the rider's forearms and elbows, and mounted into an attachment mechanism located in the Forearm Support Platform.
Figure 3:
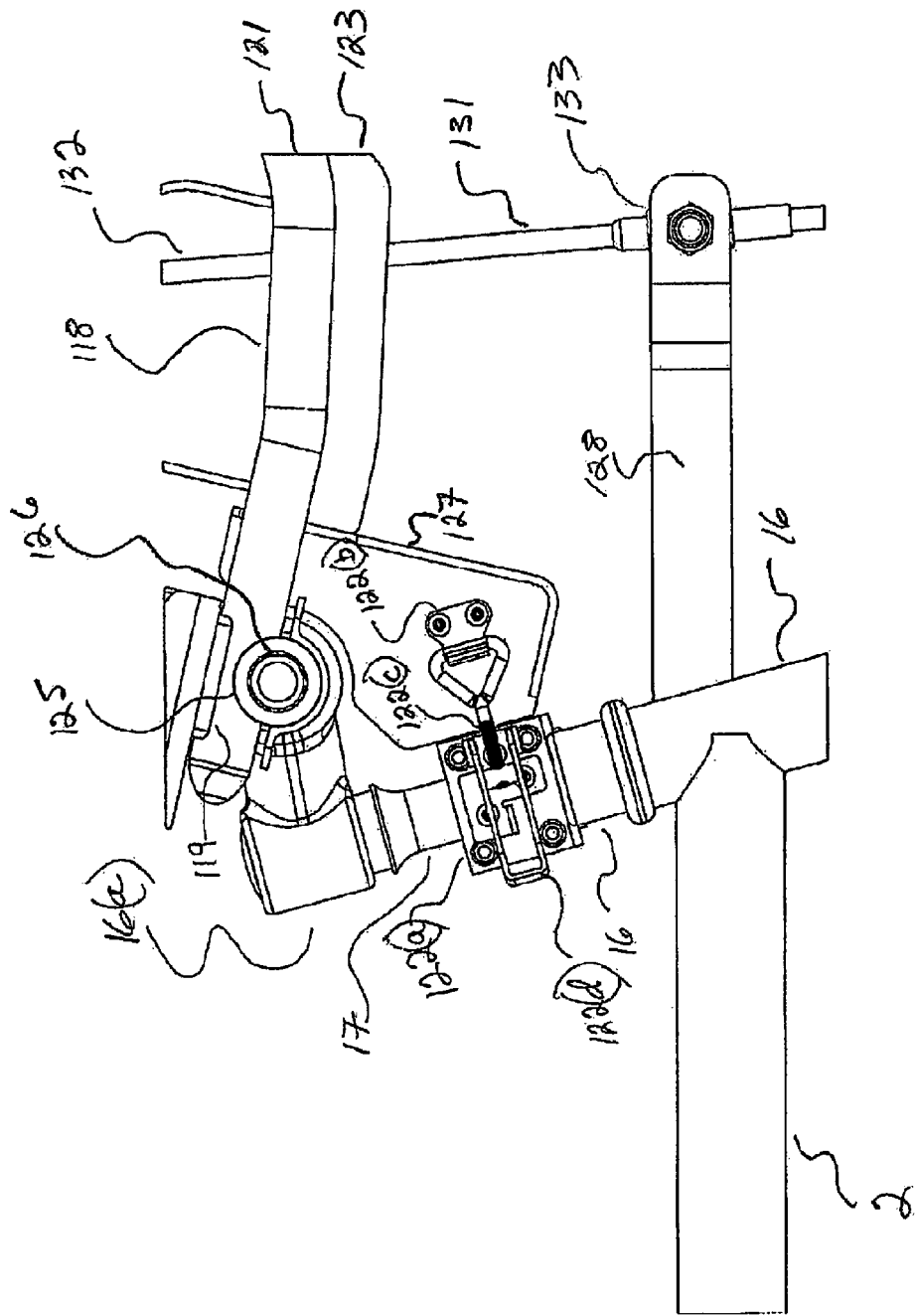
FIG. 3 illustrates a side view of an exemplar means for using a connecting mechanism to hold stationary, and in a non-pumping condition, the on-demand Forearm/hand Bars attached to the steerable front end of the Bicycle.

If the rider wishes to lock-out the angular/linear/vertical movement of the Forearm/hand Bars 118, he moves the Lever 122*d* attached to both the Latch Bracket 122*a* and the Clasp 122*c* in such a manner that the Clasp 122*c* is rotated into position with the Clasp Hook 122*b* so that he can pull back on the Lever 122*d*, and thereby lock the Clasp 122*c* into the Receiving Bracket 122*b*. The Receiving Bracket is affixed to the Downward Stroke Stopper 127. The Forearm/hand Bars 118 will then no longer move in a vertical direction. This is shown in FIG. 3.

If the rider wishes to not have on-demand Dual Power capability in providing power to the Crank Axle 13, but instead to always have the Forearm/hand pumping Bars 118 move rotationally/linearly, vertically in unison with the rotation of the Crank Axle 13 by the rider's legs, then one would not use a Flywheel 337. Instead, the Connecting Bridge Rod 335*b* would be attached to the Rear Rod End Bearing 336, which would be affixed directly to a point near the perimeter of the Upper Rear Sprocket 338.

The unique Dual Power drive train described herein provides a system whereby the rider of a Bicycle 1 can transfer nearly 100% of his lineally generated power from pumping the Forearm/hand Bars 118 in a curling motion. Power is generated during both movements of the rider, first "pulling-up and back" and then "pushing-down and forward", on the Forearm/hand Bars 118. Through use of the "push-pull" Cable System, this power is then transferred into the rotating Crank Axle 13, as outlined in this Patent Application. There is a small amount of power lost in bearing and cable movement friction. This power can be delivered on-demand to the Crank Axle 13 through the installation of a One-way Bearing Clutch 337*a* mounted on the Flywheel 337, in conjunction with, for example, a Cam and Cam Follower 337*b* to push the Flywheel 337 through the top dead center position of the Flywheel 337. Even though the rider is providing lineal power to the rotating Crank Axle 13, by pumping the Forearm/hand Bars 118 rotationally/linearly/vertically "up and down", he simultaneously has complete control of the Bicycle 1 by turning the Front Wheel 6, left or right, and thereby control the direction of travel of the Bicycle 1.

Figure 9A:
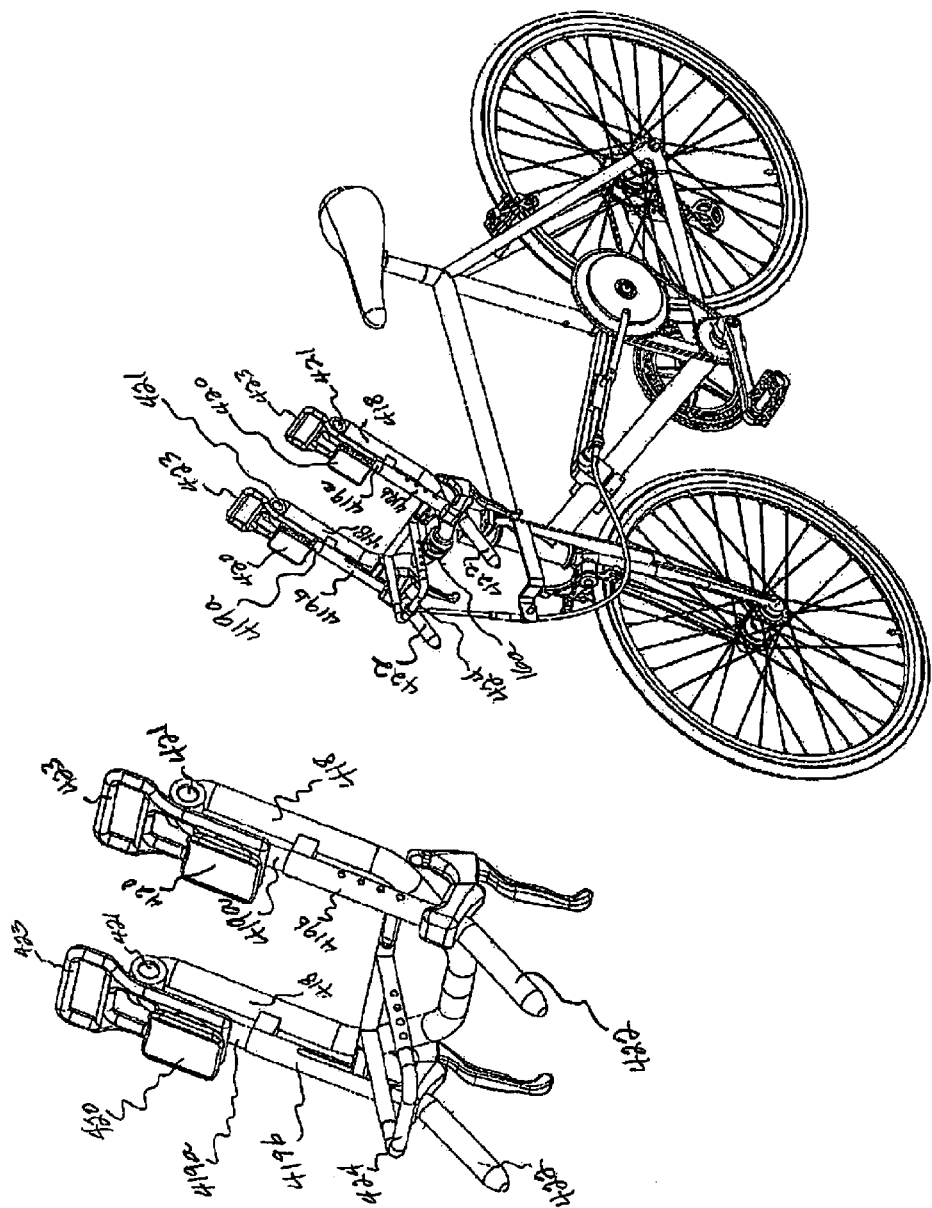
FIG. 9a is a perspective view of an upright mounted set of Forearm/hand Bars located on top of the Fulcrum Rod and mounted in a diagonal configuration.
Figure 9B:
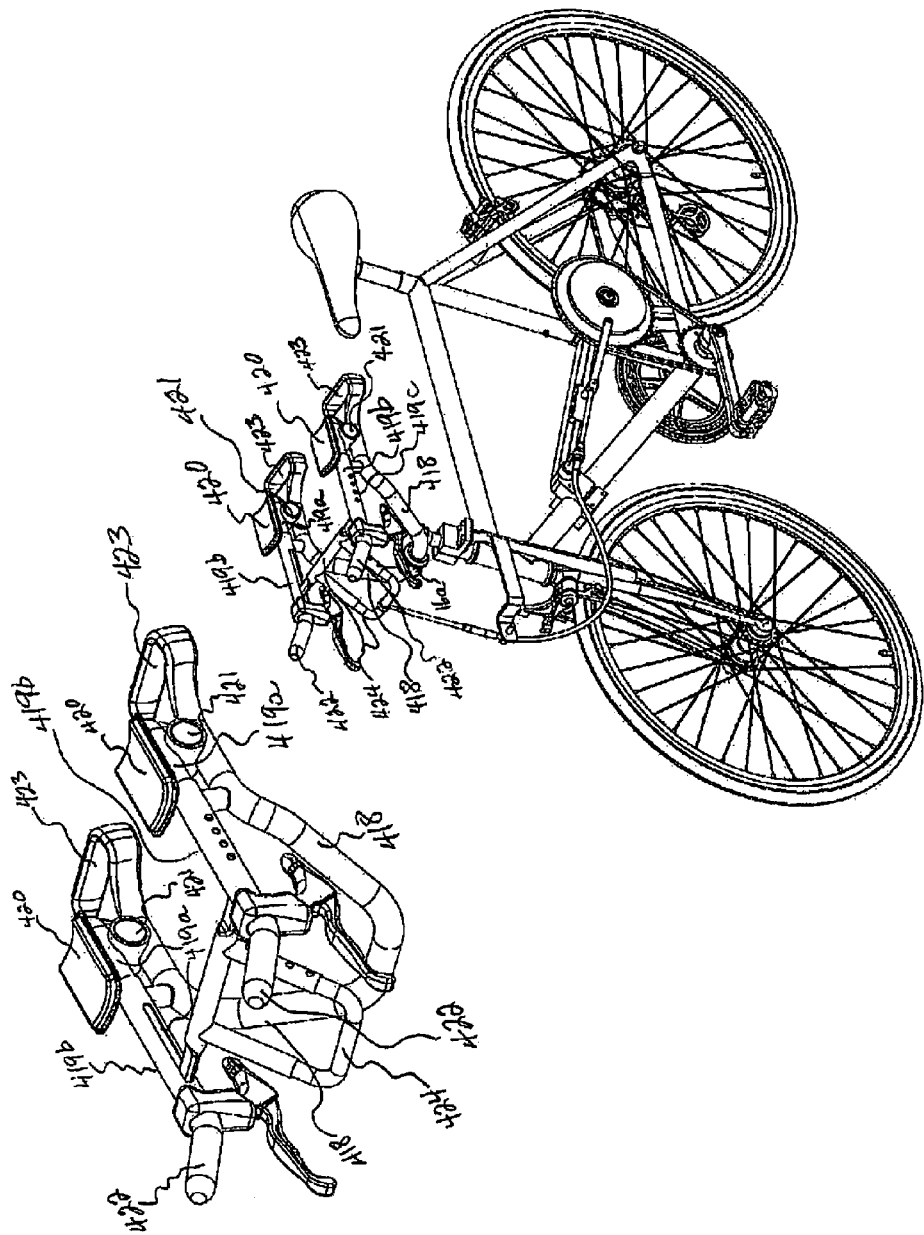
FIG. 9b is a perspective view of an upright mounted set of Forearm/hand Bars located on top of the Fulcrum Rod, and mounted in a horizontal position.

Upright Sitting Rider Forearm/arm Bar System. In riding situations in which the rider is sitting upright in the saddle 8 to ride the Bicycle 1, the fulcrum rod 418 and forearm/hand bars 419 are located behind the turning tube 17, and may be positioned: a) diagonally from the stem 16*a*, or b) diagonally and horizontally relative to the stem 16*a* and riding surface, as shown in FIGS. 9*a* and 9*b*. In either of these two configurations for positioning of the Forearm/hand Bars 419, the fulcrum rod 418 is attached to the stem 16*a* and turning tube 17, and each side of the fulcrum rod 418 is positioned in the direction of the rear of the Bicycle 1, as shown in FIGS. 9*a* and 9*b*. At each of the two ends of the fulcrum rod 418 is attached a hinge 421. Positioned on top of each side of the Fulcrum Rod 418 (left and right sides) is a separate Forearm/hand Bar 419. At the rear end of each Forearm/hand Bar is positioned a hinge 421. This Hinge 421 is connected to each of the two ends of the Fulcrum Rod 418, and the rear end of each of the two Forearm/hand Bars 419. Thus, each hinge 421 connects its respective left or right Forearm/hand Bar 419 to the requisite side of the Fulcrum Rod 418.

These Hinges or Bearings 421 use the Fulcrum Rod 418 as their base with which to permit the Forearm/hand Bars 419 to be rotated over these Hinges 421 while the rider is pumping the Forearm/hand Bars 419 rotationally "up and down". Because the Fulcrum Rod 418 is attached to the Turning Tube 17 at the Stem 16*a*, the rider is able to steer the Bicycle 1, by simply turning the Forearm/hand Bars 419 to the right or left, which simultaneously turns the Front Wheel 6 and changes his direction of travel. The Fulcrum Rod 418 remains in a stationary position, relative to the rider rotationally pumping the upper Forearm/hand Bars 419. Each forearm/hand bar 419 is comprised of two separate rods, one is located inside the other, such that the Exterior Forearm/hand Rod 419*b* may be moved in a telescoping manner over the Interior Forearm Rod 419*a* in order to adjust the location of the hand grips 422 either toward or away from the shoulders of the rider. A pin is then inserted into an aperture 419*d* on the side of these rods 419 and 418 and connects them together so that they are held in a stable position one to the other.

Attached at the front end of this Telescoping Forearm/hand Rod 419*b* is the Hand Grip 422. Thus, if the rider adjusts and moves Telescoping Forearm/hand Rod 419*b* toward the rider, he will sit in a more upright position relative the riding surface. Adjustment of this same Telescoping Rod 419*b* toward the front will permit the rider to position his torso in a leaning forward position. In either case, the rider can adjust his position in the Saddle 8 to his most comfortable riding position.

In addition, FIGS. 9*a* and 9*b* show the location of Mounting Handles 423 located on the rear end of each Forearm/hand Bar 419*b* to assist the rider, especially disabled riders, in mounting the Bicycle 1 for riding. Without these Bicycle Mounting Handles 423, the rider would only have a Hinge 421 or Forearm and Elbow Support Platform 420 to grasp and assist him in mounting the Bicycle 1. In order for a disabled person to easily mount the Dual Powered Bicycle 1, he would simply grasp in his hand one of the Mounting Handles 423, put one foot on the appropriate Pedal 9, push-off with the foot remaining on the ground, and start pumping the Forearm/hand Bars 419*a* rotationally "up and down" while simultaneously pumping his prosthetic legs and feet on the Pedals 9 and 10 to commence his Bicycle 1 ride.

Since many modifications, variations, and changes in detail can be made to the described preferred embodiments of the invention, it is intended that all matters in the foregoing description, and shown in the accompanying drawings, be interpreted as illustrative and not in a limiting sense. Therefore, it is understood that the scope of the invention is not to be limited except as otherwise set forth in the following claims.

The invention claimed is:

1. An arm powered propulsion system for use with a cycle vehicle, the system comprising:
   forearm/hand bars pivotally coupled to a cycle vehicle, wherein the forearm/hand bars are pivotal together in an up power stroke and pivotal together in a down power stroke; and
   a push/pull cable operatively coupled between the forearm/hand bars and a crank axle of the cycle vehicle, wherein the push/pull cable drives the crank axle of the cycle vehicle in response to movement of the forearm/hand bars in the up power stroke to provide power to the crank axle and the down power stroke to provide power to the crank axle.

2. The system of claim 1, wherein the push/pull cable is operatively coupled to the crank axle by one of a gear or a sprocket and chain.

3. The system of claim 2, further comprising a flywheel operatively coupled between the push/pull cable and one of the gear or the sprocket.

4. The system of claim 3, further comprising a cam and a cam follower to push the flywheel through a top dead center position of the flywheel during rotation.

5. The system of claim 2, further comprising an upper drive system comprising an upper telescoping rod moveable within a stationary upper telescoping rod support sleeve, wherein the upper telescoping rod is coupled to the forearm/hand bars and the upper telescoping rod moves in response to movement of the forearm/hand bars in the up and down power strokes.

6. The system of claim 5, further comprising a lower drive system comprising a lower telescoping rod moveable within a stationary lower telescoping rod support sleeve, wherein the lower telescoping rod is coupled to the gear or the sprocket.

7. The system of claim 6, wherein the push/pull cable is connected between the upper telescoping rod and the lower telescoping rod, wherein the push/pull cable moves the lower telescoping rod back and forth in response to movement of the upper telescoping rod up and down.

8. The system of claim 7, wherein the upper telescoping rod is coupled to the forearm/hand bars using two racks and a pinion gear, wherein one rack is coupled to the forearm/hand bars, the other rack is coupled to the upper telescoping rod and the pinion gear is operationally coupled to each rack.

9. The system of claim 8, wherein the upper telescoping rod extends and retracts in a linear direction with respect to the stationary upper rod support sleeve in response to operation of the two racks and the pinion gear.

10. The system of claim 6, wherein the lower telescoping rod is coupled to the gear or sprocket using a connecting bridge rod coupled on a front end to each the lower telescoping rod and a sliding support bracket and on a back end to the gear or sprocket, wherein movement of the lower telescoping rod back and forth moves the connecting bridge rod back and forth to rotate the gear or the sprocket.

11. The system of claim 10, wherein the sliding support bracket comprises a linear path of travel for the lower telescoping rod as it extends and retracts with respect to the stationary lower telescoping rod support sleeve.

12. The system of claim 8, wherein the lower telescoping rod is coupled to the gear or sprocket using a connecting bridge rod coupled on a front end to each the lower telescoping rod and a sliding support bracket and on a back end to the gear or sprocket, wherein movement of the lower telescoping rod back and forth moves the connecting bridge rod back and forth to rotate the gear or the sprocket.

13. The system of claim 12, wherein the sliding support bracket comprises a linear path of travel for the lower telescoping rod as it extends and retracts with respect to the stationary lower telescoping rod support sleeve.

14. A dual powered propulsion system for use with a bicycle, the system comprising:
  a foot powered propulsion system; and
  a supplemental arm powered propulsion system comprising:
    forearm/hand bars pivotally coupled to the bicycle, wherein the forearm/hand bars are pivotal together in an up power stroke and pivotal together in a down power stroke, and the forearm/hand bars are turnable left and right to steer the bicycle; and
    a push/pull cable coupled between the forearm/hand bars and the foot powered propulsion system of the bicycle, wherein the push/pull cable drives the foot powered propulsion system of the bicycle in response to movement of the forearm/hand bars in the up power stroke to provide power to the crank axle and the down power stroke to provide power to the crank axle.

15. The system of claim 14, wherein the push/pull cable is operatively coupled to a crank axle of the foot powered propulsion system by one of a gear or a sprocket and chain.

16. The system of claim 15, further comprising a flywheel operatively coupled between the push/pull cable and one of the gear or the sprocket.

17. The system of claim 16, further comprising a cam and a cam follower to push the flywheel through a top dead center position of the flywheel during rotation.

18. The system of claim 15, further comprising an upper drive system comprising an upper telescoping rod moveable within a stationary upper telescoping rod support sleeve, wherein the upper telescoping rod is coupled to the forearm/hand bars and the upper telescoping rod moves in response to movement of the forearm/hand bars in the up and down power strokes.

19. The system of claim 18, further comprising a lower drive system comprising a lower telescoping rod moveable within a stationary lower telescoping rod support sleeve, wherein the lower telescoping rod is coupled to the gear or sprocket.

20. The system of claim 19, wherein the push/pull cable is connected between the upper telescoping rod and the lower telescoping rod, wherein the push/pull cable moves the lower telescoping rod back and forth in response to movement of the upper telescoping rod up and down.

21. The system of claim 20, wherein the upper telescoping rod is coupled to the forearm/hand bars using two racks and a pinion gear, wherein one rack is coupled to the forearm/hand bars, the other rack is coupled to the upper telescoping rod and the pinion gear is operationally coupled to each rack.

22. The system of claim 21, wherein the upper telescoping rod extends and retracts in a linear direction with respect to the stationary upper rod support sleeve in response to operation of the two racks and the pinion gear.

23. The system of claim 19, wherein the lower telescoping rod is coupled to the gear or sprocket using a connecting bridge rod coupled on a front end to each the lower telescoping rod and a sliding support bracket and on a back end to the gear or sprocket, wherein movement of the lower telescoping rod back and forth moves the connecting bridge rod back and forth to rotate the gear or sprocket.

24. The system of claim 23, wherein the sliding support bracket comprises a linear path of travel for the lower telescoping rod as it extends and retracts with respect to the stationary lower telescoping rod support sleeve.

25. The system of claim 20, wherein the lower telescoping rod is coupled to the gear or sprocket using a connecting bridge rod coupled on a front end to each the lower telescoping rod and a sliding support bracket and on a back end to the gear or sprocket, wherein movement of the lower telescoping rod back and forth moves the connecting bridge rod back and forth to rotate the gear or sprocket.

26. The system of claim 25, wherein the sliding support bracket comprises a linear path of travel for the lower telescoping rod as it extends and retracts with respect to the stationary lower telescoping rod support sleeve.

27. The system of claim 1, further comprising an arm powered lockout mechanism, wherein the lockout mechanism prevents movement of the forearm/hand bars in the up and down power strokes.

28. The system of claim 1, wherein each forearm/hand bar comprises an exterior forearm/hand rod moveable in a telescoping manner over an interior forearm rod to adjust a location of hand grips either toward or away from a rider, wherein moving the exterior forearm/hand rod toward the rider results in a more upright position relative the riding surface and moving the exterior forearm/hand rod toward a front of the cycle vehicle results in a leaning forward position.

29. The system of claim 11, wherein the front end of the connecting bridge rod travel in the linear path and the back end of the connecting bridge rod travels in a circular path.

30. The system of claim 13, wherein the front end of the connecting bridge rod travels in the linear path and the back end of the connecting bridge rod travels in a circular path.

31. The system of claim 24, wherein the front end of the connecting bridge rod travels in the linear path and the back end of the connecting bridge rod travels in a circular path.

32. The system of claim 26, wherein the front end of the connecting bridge rod travels in the linear path and the back end of the connecting bridge rod travels in a circular path.

\* \* \* \* \*